US012587670B2

(12) United States Patent
Laroche et al.

(10) Patent No.: US 12,587,670 B2
(45) Date of Patent: Mar. 24, 2026

(54) VIDEO CODING AND DECODING

(71) Applicant: CANON KABUSHIKI KAISHA, Tokyo (JP)

(72) Inventors: Guillaume Laroche, Saint Aubin d'Aubigné (FR); Patrice Onno, Rennes (FR); Romain Bellessort, St Grégoire (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/696,286

(22) PCT Filed: Sep. 29, 2022

(86) PCT No.: PCT/EP2022/077094
§ 371 (c)(1),
(2) Date: Mar. 27, 2024

(87) PCT Pub. No.: WO2023/052489
PCT Pub. Date: Apr. 6, 2023

(65) Prior Publication Data
US 2024/0406434 A1 Dec. 5, 2024

(30) Foreign Application Priority Data

Sep. 29, 2021 (GB) ..................................... 2113968
Dec. 14, 2021 (GB) ..................................... 2118105

(51) Int. Cl.
*H04N 19/513* (2014.01)
*H04N 19/139* (2014.01)
(52) U.S. Cl.
CPC ......... *H04N 19/513* (2014.11); *H04N 19/139* (2014.11)

(58) Field of Classification Search
CPC ........................... H04N 19/139; H04N 19/513
See application file for complete search history.

(56) References Cited

U.S. PATENT DOCUMENTS 10,701,393 B2 6/2020 Chen
10,911,769 B2 2/2021 Zhang
(Continued)

FOREIGN PATENT DOCUMENTS

EP 3806472 A1 4/2021
JP 2016042727 A 3/2016
(Continued)

OTHER PUBLICATIONS

Jicheng An, et al., Enhanced Merge Mode based on JEM7.0, Joint Video Exploration Team of ITU-T 16 WP 3 and ISO/IEC JTC1/SC29/WG11, 10th Meeting, San Diego, US, Apr. 10-20, 2018, Doc. No. JVET-J0059-v1, XP030248269.
(Continued)

*Primary Examiner* — Jeremiah C Hallenbeck-Huber
(74) *Attorney, Agent, or Firm* — Canon U.S.A., Inc. IP Division

(57) ABSTRACT

Improvements to the derivation and ordering of one or more pairwise motion vector predictor candidates in the list of motion vector predictor candidates are disclosed. An initial list of motion vector predictor candidates is generated for decoding a portion of an image, and when candidate reordering is selected for the image portion, reordering at least a portion of said initial list to generate a reordered motion vector predictor candidate list; and adding a pairwise motion vector predictor candidate into said reordered list.

16 Claims, 28 Drawing Sheets

Regular Merge candidates list | Updated list | Add pairwise If not duplicate | Updated list

| Regular Merge candidates list | | Updated list | Add pairwise If not duplicate | | Updated list |
|---|---|---|---|---|---|
| Cand0 | | NewC0 = Cand3 | NewC0 = Cand3 | | NewC0 = Pairwise |
| Cand1 | | NewC1 = Cand0 | NewC1 = Cand0 | | NewC1 = Cand3 |
| Cand2 | ARMC | NewC2 = Cand2 | NewC2 = Cand2 | ARMC | NewC2 = Cand0 |
| Cand3 | | NewC3 = Cand1 | NewC3 = Cand1 | | NewC3 = Cand2 |
| Cand4 | | Cand4 | Pairwise= Pair(NewC0,NewC1) | | NewC4 = Cand1 |
| Cand5 | | Cand5 | Cand4 | | Cand4 |
| Cand6 | | Cand6 | Cand5 | | Cand5 |
| Cand7 | | Cand7 | Cand6 | | Cand6 |
| Cand8 | | Cand8 | Cand7 | | Cand7 |
| Cand9 | | Cand9 | Cand8 | | Cand8 |
| | | | ~~Cand9~~ | | |

(56)                    References Cited

U.S. PATENT DOCUMENTS

| | | | | |
|---|---|---|---|---|
| 11,070,797 | B2 | 7/2021 | Park | |
| 2017/0332099 | A1 | 11/2017 | Lee | |
| 2018/0324454 | A1 | 11/2018 | Lin | |
| 2020/0014931 | A1 | 1/2020 | Hsiao | |
| 2020/0112743 | A1 | 4/2020 | Xu | |
| 2020/0162743 | A1 | 5/2020 | Park | |
| 2020/0296360 | A1* | 9/2020 | Han | H04N 19/157 |
| 2020/0374541 | A1* | 11/2020 | Gao | H04N 19/70 |
| 2021/0037238 | A1* | 2/2021 | Park | H04N 19/105 |
| 2021/0037240 | A1 | 2/2021 | Zhang | |
| 2021/0092357 | A1 | 3/2021 | Wang | |
| 2021/0092379 | A1 | 3/2021 | Zhang | |
| 2021/0120262 | A1 | 4/2021 | Chen | |
| 2021/0250580 | A1* | 8/2021 | Chen | H04N 19/105 |
| 2021/0289226 | A1 | 9/2021 | Abe | |
| 2022/0078474 | A1* | 3/2022 | Tamse | H04N 19/176 |
| 2022/0239899 | A1* | 7/2022 | Zhang | H04N 19/46 |
| 2022/0377318 | A1* | 11/2022 | Robert | H04N 19/105 |

FOREIGN PATENT DOCUMENTS

| | | | |
|---|---|---|---|
| WO | 2020056143 | A1 | 3/2020 |
| WO | 2020060312 | A1 | 3/2020 |
| WO | 2020172342 | A1 | 8/2020 |
| WO | 2020182147 | A1 | 9/2020 |
| WO | 2020185925 | A1 | 9/2020 |
| WO | 2020192736 | A1 | 10/2020 |
| WO | 2020257766 | A1 | 12/2020 |
| WO | 2021006579 | A1 | 1/2021 |

OTHER PUBLICATIONS

Yongjoon Jeon, On MVP list pruning process, Joint Collaborative Team on Video Coding (JCT-VC) of ITU-T SG16 WP3 and ISO/IEC JTC1/SC29/WG11, 6th Meeting, Jul. 14-22, 2011, Torino, IT, Doc. No. JCTVC-F105, XP30009128.

Naeri Park, et al., Non-CE4 : The proposed BCW index derivation for pairwise candidate, Joint Video Experts Team (JVET) of ITU-T SG 16 WP 3 and ISO/IEC JTC 1/SC 29/WG11, 15th Meeting, Gothenburg, SE, Jul. 3-12, 2019, Doc. No. JVET-O0367, XP030219353.

A. Robert, et al., EE2-related: Inter coding modes modifications, Joint Video Experts Team (JVET) of ITU-T SG 16 WP 3 and ISO/IEC JTC 1/SC 29, 22nd Meeting, by teleconference, Apr. 20-28, 2021, Doc. No. JVET-V0089, XP30294177.

* cited by examiner (a)       (b)

(c)       (d)

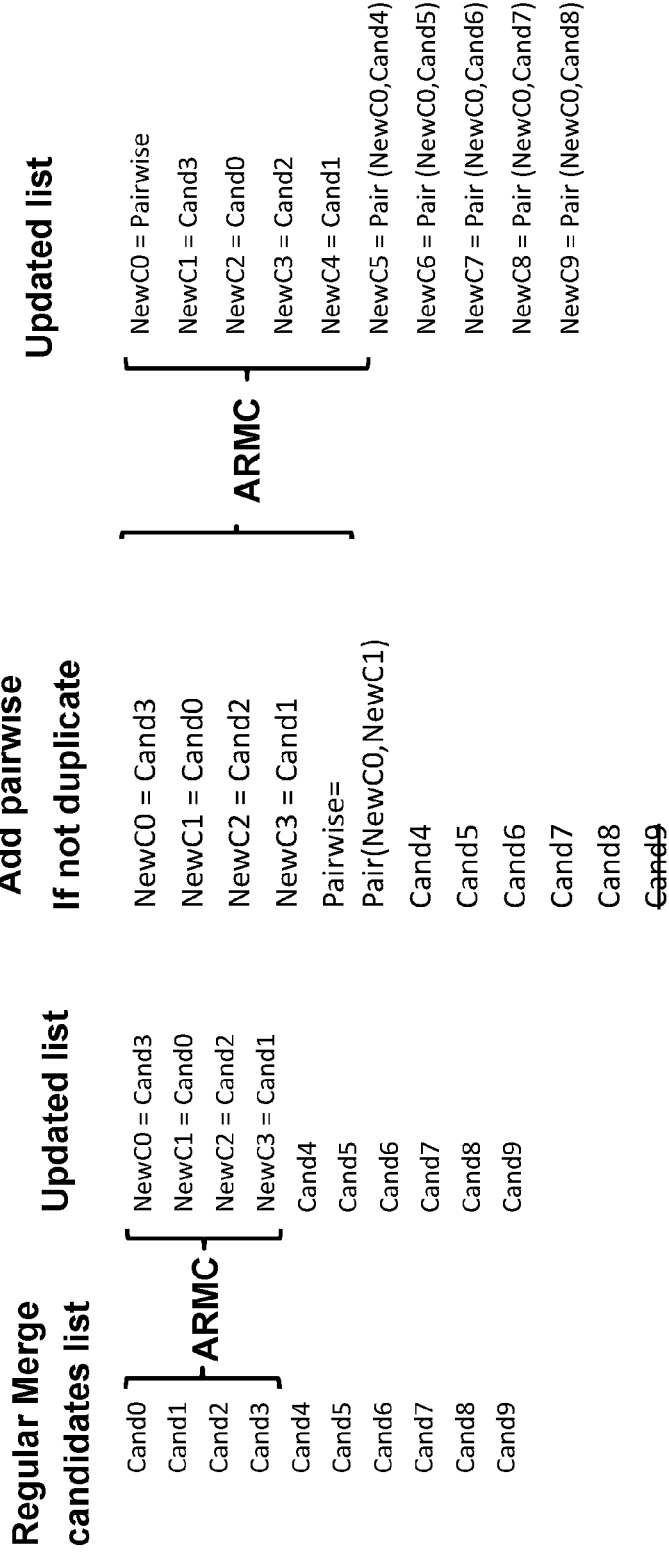

Regular Merge candidates list

| | |
|---|---|
| Cand0 | ⎫ |
| Cand1 | ⎬ ARMC |
| Cand2 | |
| Cand3 | ⎭ |
| Cand4 | |
| Cand5 | |
| Cand6 | |
| Cand7 | |
| Cand8 | |
| Cand9 | |

Updated list

NewC0 = Cand3
NewC1 = Cand0
NewC2 = Cand2
NewC3 = Cand1
Cand4
Cand5
Cand6
Cand7
Cand8
Cand9

Add pairwise If not duplicate

NewC0 = Cand3
NewC1 = Cand0
NewC2 = Cand2
NewC3 = Cand1
Pairwise= Pair(NewC0,NewC1)
Cand4
Cand5
Cand6
Cand7
Cand8
~~Cand9~~

Updated list

NewC0 = Pairwise
NewC1 = Cand3
NewC2 = Cand0
NewC3 = Cand2
NewC4 = Cand1
NewC5 = Pair (NewC0,Cand4)
NewC6 = Pair (NewC0,Cand5)
NewC7 = Pair (NewC0,Cand6)
NewC8 = Pair (NewC0,Cand7)
NewC9 = Pair (NewC0,Cand8)

Figure 20b

VIDEO CODING AND DECODING

CROSS REFERENCE TO RELATED APPLICATION

This application is the National Phase application of PCT Application No. PCT/EP2022/077094, filed on Sep. 29, 2022. This application claims the benefit under 35 U.S.C. § 119(a)-(d) of United Kingdom Patent Application No. 2113968.8, filed on Sep. 29, 2021 and entitled "VIDEO CODING AND DECODING", and of United Kingdom Patent Application No. 2118105.2, filed on Dec. 14, 2021 and entitled "VIDEO CODING AND DECODING". The above cited patent applications are incorporated herein by reference in its entirety.

FIELD OF INVENTION

The present invention relates to video coding and decoding.

BACKGROUND

The Joint Video Experts Team (JVET), a collaborative team formed by MPEG and ITU-T Study Group 16's VCEG, released a new video coding standard referred to as Versatile Video Coding (VVC). The goal of VVC is to provide significant improvements in compression performance over the existing HEVC standard (i.e., typically twice as much as before). The main target applications and services include—but not limited to—360-degree and high-dynamic-range (HDR) videos. Particular effectiveness was shown on ultra-high definition (UHD) video test material. Thus, we may expect compression efficiency gains well-beyond the targeted 50% for the final standard.

Since the end of the standardisation of VVC v1, JVET has launched an exploration phase by establishing an exploration software (ECM). It gathers additional tools and improvements of existing tools on top of the VVC standard to target better coding efficiency.

Amongst other modifications, compared to HEVC, VVC has a modified set of 'merge modes' for motion vector prediction which achieves greater coding efficiency at a cost of greater complexity. Motion vector prediction is enabled by deriving a list of 'motion vector predictor candidates' with the index of the selected candidate being signalled in the bitstream. The merge candidate list is generated for each coding unit (CU). But CUs may be split into smaller blocks for Decoder-side Motion Vector Refinement (DMVR) or other methods.

The make-up and order of this list can have significant impact on coding efficiency as an accurate motion vector predictor reduces the size of the residual or the distortion of the block predictor, and having such a candidate at the top of the list reduces the number of bits required to signal the selected candidate. The present invention aims to improve at least one of these aspects.

Modifications incorporated into VVC v1 and ECM mean there can be up to 10 motion vector predictor candidates; this enables a diversity of candidates, but the bitrate can increase if candidates lower down the list are selected. The present invention broadly relates to improvements to the derivation and ordering of one or more 'pairwise' motion vector predictor candidates in the list of motion vector predictor candidates. A 'pairwise' motion vector predictor candidate is a candidate which is combined or averaged from two or more other candidates in the list of candidates.

SUMMARY OF THE DISCLOSURE

According to one aspect of the invention there is provide a method of generating a list of motion vector predictor candidates for decoding a portion of an image encoded using a merge mode, the method comprising: determining a merge mode used to encode said image portion; adding a pairwise motion vector predictor candidate to a list of motion vector predictor candidates in dependence on said determination.

This method improves coding performance by enabling the pairwise candidate for merge modes where this candidate is likely to be selected.

Optionally, the pairwise motion vector candidate is not added when said merge mode is Template matching or GEO.

Optionally, the pairwise motion vector candidate is not added when the pairwise candidate is an average candidate.

Optionally, the pairwise motion vector candidate is added when said merge mode is regular or CIIP merge mode.

Optionally, for improved bitrate reduction, the method further comprises adding the pairwise motion vector candidate nearer the top of the list than the bottom.

According to another aspect of the invention there is provided a method of generating a list of motion vector predictor candidates for decoding a portion of an image, the method comprising: generating a pairwise motion vector predictor candidate; adding said pairwise motion vector predictor candidate to a list of candidate motion vector predictor candidates; wherein the position of the candidate is nearer the top of the list than the bottom.

In such a way, the bitrate can be reduced as the pairwise candidate has surprisingly been found to be commonly selected and a position nearer the top of the list than the bottom can be coded using fewer bits.

Optionally, the method further comprises adding the pairwise motion vector candidate in a position in the list of motion vector predictor candidates immediately following motion predictor candidates used to generate the pairwise motion vector predictor candidate.

Optionally, for improved coding efficiency, the method further comprises adding the pairwise motion vector candidate in a position in the list of motion vector predictor candidates immediately following the first two spatial motion predictor candidates.

Optionally, the method further comprises adding the pairwise motion vector candidate in the second position in the list of motion vector predictor candidates.

According to another aspect of the invention there is provided a method of generating a list of motion vector predictor candidates for decoding a portion of an image, the method comprising: generating an initial list of motion vector predictor candidates; and when candidate reordering is selected for the image portion, reordering at least a portion of said initial list to generate a reordered motion vector predictor candidate list; and adding a pairwise motion vector predictor candidate into said reordered list.

This method improves coding performance by placing the candidates, including a pairwise candidate, in the most efficient order.

Optionally, for improved coding efficiency, the method further comprises determining said pairwise from the two top candidates in the reordered list.

Optionally, for improved coding efficiency, the method further comprises applying the reordering process on said determined pairwise candidate.

Optionally, the portion of said initial list which is reordered is a maximum of the top N−1 candidates.

Optionally, the pairwise candidate is reordered is the Nth candidate.

Optionally, for improved coding efficiency, the method further comprises removing the lowest candidate from the reordered list after adding said pairwise motion vector predictor candidate.

Optionally, all candidates in the initial list are reordered to generate the reordered motion vector predictor candidate list.

Optionally, the method further comprises determining said pairwise candidate using the first candidate in the reordered list and an $i^{th}$ candidate, where i is the index of the initial list of motion vector predictor candidates.

Optionally, one or more additional pairwise motion vector predictor candidates, are included in the reordered list at a predetermined position.

Optionally, the predetermined position is the $5^{th}$ position in the reordered list. Optionally, the predetermined position is at the start of the second half of the reordered list.

Optionally, the initial list includes a first pairwise motion vector candidate and the additional pairwise motion vector candidate is added at a position immediately following the first pairwise motion vector candidate in the reordered list.

According to another aspect of the invention there is provided a method of generating a list of motion vector predictor candidates for decoding a portion of an image, the method comprising: generating an initial list of motion vector predictor candidates; deriving at least one pairwise candidate from two candidates in said initial list; said two candidates comprising the first candidate in the list and an $i^{th}$ candidate.

This method improves coding performance by improving the relevance of the an $i^{th}$ of candidates by combining it with the most likely candidate.

Optionally, for improved coding efficiency, the ith candidate is from the initial candidate list which has not been reordered.

Optionally, the method further comprises replacing the ith candidate in the list with the determined pairwise candidate.

Optionally, the number of pairwise candidates is limited to 4.

Optionally, for improved coding efficiency, the method further comprises determining whether the pairwise motion vector predictor candidate is similar to an existing candidate in the list prior to adding the pairwise candidate to the list. Preferably, determining whether the pairwise motion vector predictor candidate is similar to an existing candidate in the list comprises determining a threshold motion vector difference.

According to another aspect of the invention there is provided a method of generating a list of motion vector predictor candidates for decoding a portion of an image, the method comprising: generating an initial list of motion vector predictor candidates; deriving a pairwise candidate from two candidates in said initial list; determining whether the pairwise motion vector predictor candidate is similar to an existing candidate in the list prior to adding the pairwise candidate to the list; wherein determining whether the pairwise motion vector predictor candidate is similar to an existing candidate in the list comprises determining a threshold motion vector difference.

This method improves coding performance by ensuring a diversity of motion vector prediction candidates in the list, and refining towards the ideal candidate if appropriate.

Optionally, the method further comprises the threshold motion vector difference depends on the search range of a decoder side motion vector method.

Optionally, the threshold motion vector difference depends on the enabling of the disabling of the decoder side motion vector method.

Optionally, the threshold motion vector difference depends on a POC distance or absolute POC value.

Optionally, the threshold motion vector difference depends on the position in the list of the candidates used to build the pairwise candidate.

Optionally, the threshold motion vector difference is set to a first value greater or equal to zero when the candidates used to build the pairwise candidate are the first two candidates in the list, and set to a second value otherwise, said second value being greater than said first value.

Optionally, the threshold motion vector difference depends on whether or not a pairwise candidate is inserted to the list or if it replaces an existing candidate.

Optionally, the threshold motion vector difference depends on whether the reference frames of the pairwise candidate or of the current frame have different directions or not.

Optionally, the threshold motion vector difference depends on whether the reference frames of the pairwise candidate or of the current frame have the same POC distance or absolute value.

According to another aspect of the invention there is provided a method of generating a list of motion vector predictor candidates for decoding a portion of an image, the list including a pairwise motion vector predictor candidate built from other motion vector predictor candidates, the method comprising: determining at least one non motion parameter for said pairwise candidate based on a characteristic of at least one other candidate.

This method improves coding performance by increasing the relevance of a non motion parameter of the pairwise candidate.

Optionally, for improved coding efficiency, the determining comprises inheriting the at least one non motion parameter from the first candidate in the list, preferably from the first and second candidates in the list.

Optionally, said at least on other candidate includes one or both of the candidates used to build the pairwise candidate.

Optionally, said or each non motion parameter is inherited from one or both of the candidates used to build the pairwise candidate Optionally, said or each non motion parameter is inherited from one or both of the candidates used to build the pairwise candidate if the candidates considered for the pairwise have the same reference frames and/or lists.

Optionally, said or each non motion parameter is inherited from the candidates used to build the pairwise candidate if the candidates used to build the pairwise candidate have the same parameter value.

Optionally, the parameter comprises a parameter related to tools which compensate illumination difference between the current block and neighboring samples. Preferably, the parameter comprises a weight for bi-prediction (BCWidx) or Local Illumination Compensation (LIC).

Optionally, for improved coding efficiency, the method further comprises inheriting the value of a parameter related to multiple hypothesis from one of the candidates used to build the pairwise candidate.

Optionally, the method comprises inheriting said value only when one or more parameters related to tools, which compensate illumination are different to a default value.

According to another aspect of the invention there is provided a method of generating a list of motion vector predictor candidates for decoding a portion of an image, the method comprising: generating a pairwise motion predictor candidate from two other motion vector predictor candidates, and adding said pairwise candidate to said list; wherein the average pairwise candidate is generated in dependence on a characteristic of the respective reference frames of the motion vector predictor candidates used to generate the pairwise motion predictor candidate.

This method improves coding performance by ensuring that average pairwise candidates are only generated when appropriate, and thus diversity of candidates is retained where necessary.

Optionally, said generating comprises determining an average of said two candidates only when the respective reference frames are the same.

Optionally, said characteristic comprises the positions of the reference frames in the list of reference frame of the current slice compared to the current frame.

Optionally, said average pairwise candidate is generated in dependence on the position of the motion vector predictor candidates used to generate the pairwise motion predictor candidate.

In another aspect of the invention there is provided a method of generating a list of motion vector predictor candidates for decoding or encoding a portion of an image, the method comprising: obtaining a first list of motion vector predictor candidates; obtaining a second list of motion vector predictor candidates; and generating the list of motion vector predictor candidates for decoding or encoding the portion of an image from the first and second lists of motion vector predictor candidates, wherein obtaining the second list comprises: obtaining motion vector predictor candidates for the second list, reordering at least a portion of the motion vector predictor candidates obtained for the second list, and adding at least one pairwise motion vector predictor candidate to said reordered candidates.

Optionally, the method includes determining said pairwise motion vector predictor candidate from the two top candidates in the reordered motion vector predictor candidates for the second list.

Optionally, the added pairwise motion vector predictor candidate does not replace a motion vector predictor candidate in the reordered list.

Optionally, the added pairwise motion vector predictor candidate is generated from two candidates comprising the first candidate in the list and an $i^{th}$ candidate, where i is between the second and the maximum number of candidates in the second list.

Optionally, the method includes further reordering the second list once the pairwise motion vector predictor candidate has been added.

Optionally, if the second list includes a pairwise motion vector predictor candidate before reordering, retaining this pairwise motion vector predictor candidate together with the pairwise motion vector predictor candidate added during the reordering of candidates or added to the reordered candidates.

Optionally, generating the list of motion vector predictor candidates for decoding or encoding the portion of an image from the first and second lists of motion vector predictor candidates comprises determining the difference value between the number of motion vector candidates in the first list and a maximum (or target) number and (where available)

including a number of motion vector predictor candidates from the second list equal (or not greater than) said difference value.

In a yet further aspect of the present invention, there is provided a method of generating a list of motion vector predictor candidates for decoding or encoding a portion of an image, comprising: obtaining a first list of motion vector predictor candidates; obtaining a second list of motion vector predictor candidates; and generating the list of motion vector predictor candidates for decoding or encoding the portion of an image from the first and second lists of motion vector predictor candidates, wherein obtaining the second list of motion vector predictor candidates comprises performing a first reordering process on motion vector predictor candidates for the second list and, not adding a pairwise candidate if the cost of the candidate which it is to replace has been evaluated in the first reordering process and a second reordering process is to be performed following the addition of the pairwise candidate.

In another aspect of the present invention, there is provided a method of generating a list of motion vector predictor candidates for decoding or encoding a portion of an image, comprising: obtaining a cost for a motion vector predictor candidate during a first reordering process; and using the cost obtained during the first reordering process in a further reordering process, in a case where the position of the motion vector predictor candidate is not among the positions which should be reordered using the further reordering process.

Optionally, the first list in any aspect above includes one or more adjacent motion vector predictor candidates (if available).

Optionally, the second list in any aspect above includes one or more non-adjacent motion vector predictor candidates (if available).

Optionally, the second list in any aspect above, includes one or more History based candidates.

Optionally, the second list in any aspect above, includes one or more temporal candidates. For example, the second list may include three temporal candidates upon which reordering process is performed.

Optionally, the second list includes all possible adjacent candidates. These may all be subject to reordering (ARMC).

Other aspects of the invention relate to corresponding encoding methods, an encoding device, a decoding device, and a computer program operable to carry out the decoding and/or encoding methods of the invention.

Further aspects of the invention are provided by the independent and dependent claims.

BRIEF DESCRIPTION OF THE DRAWINGS

Reference will now be made, by way of example, to the accompanying drawings, in which:

FIGS. 20*a* and 20*b* illustrate example pairwise candidate derivation after the reordering process of the list of merge mode candidates;

DETAILED DESCRIPTION

Figure 1:
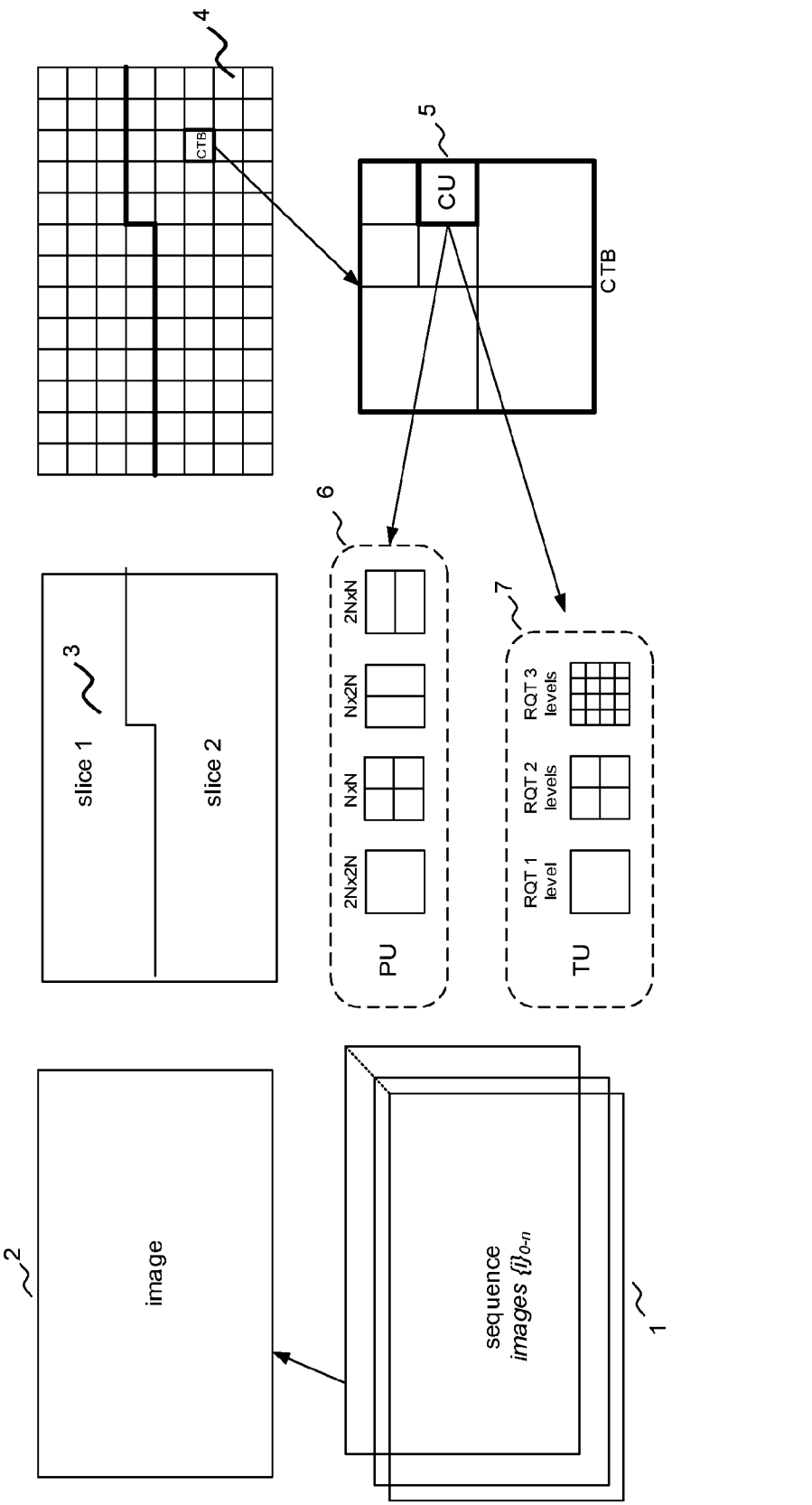
FIG. 1 is a diagram for use in explaining a coding structure used in HEVC.

FIG. 1 relates to a coding structure used in the High Efficiency Video Coding (HEVC) video and Versatile Video Coding (VVC) standards. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Other ways of splitting an image have been introduced in VVC including subpictures, which are independently coded groups of one or more slices.

Figure 2:
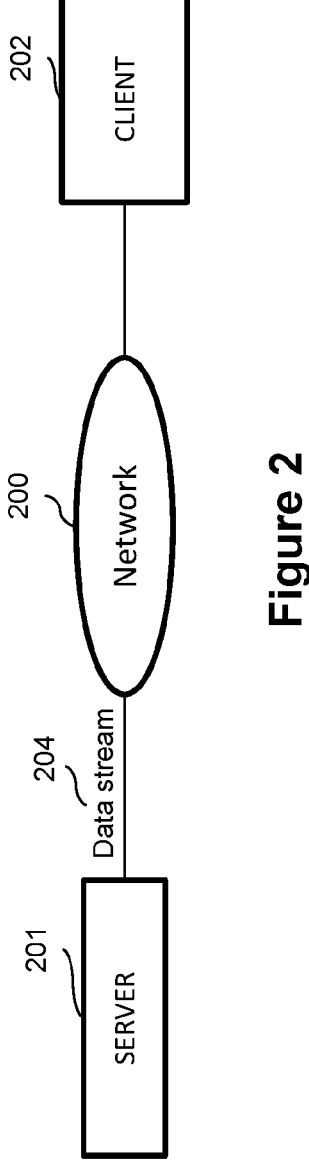
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format or VVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
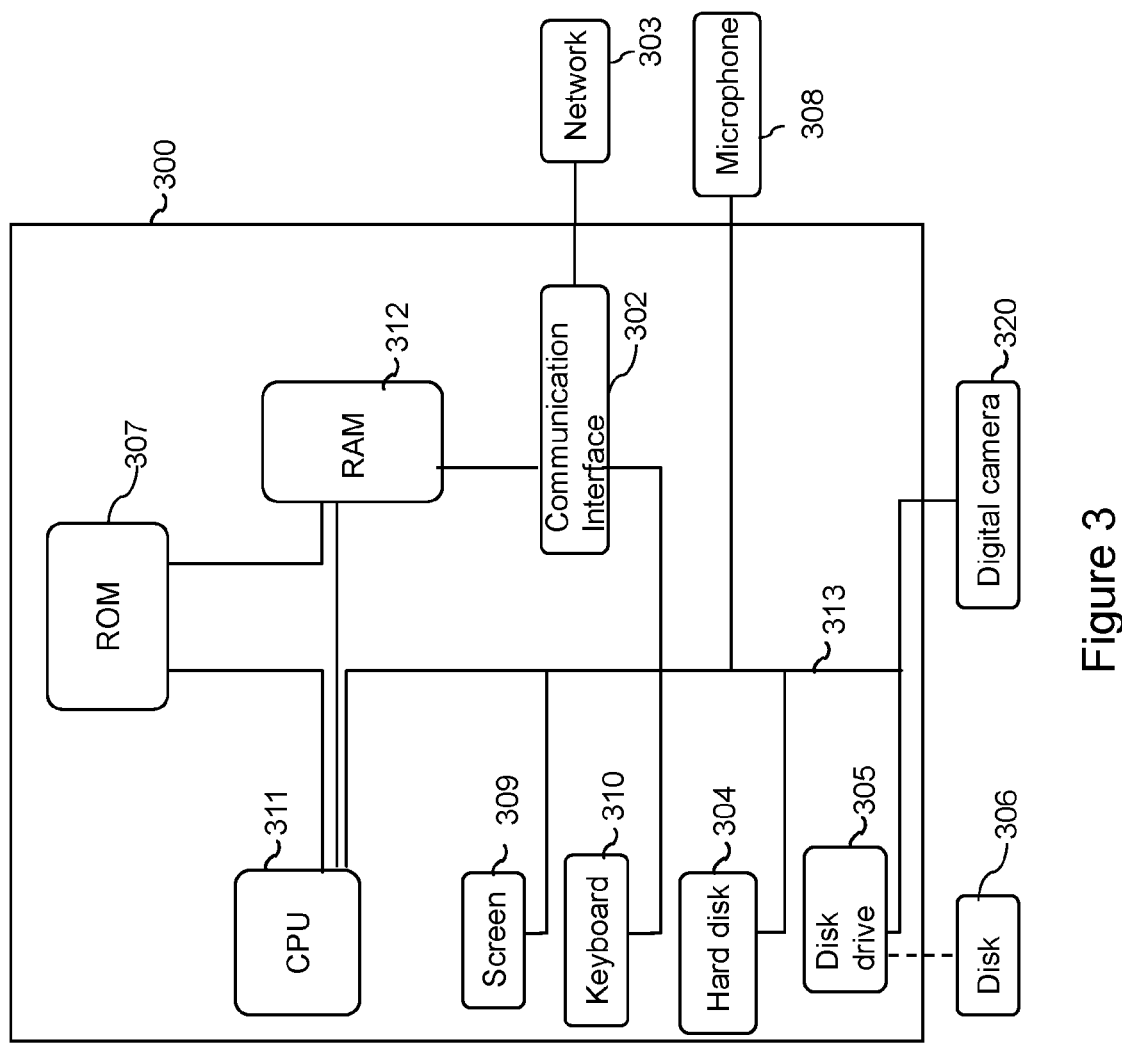
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

a central processing unit 311, such as a microprocessor, denoted CPU;

a read only memory 306, denoted ROM, for storing computer programs for implementing the invention;

a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 302 connected to a communication network 303 over which digital data to be processed are transmitted or received Optionally, the apparatus 300 may also include the following components:

a data storage means 304 such as a hard disk, for storing computer programs for implementing methods of one or more embodiments of the invention and data used or produced during the implementation of one or more embodiments of the invention;

a disk drive 305 for a disk 306, the disk drive being adapted to read data from the disk 306 or to write data onto said disk;

a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

Figure 4:
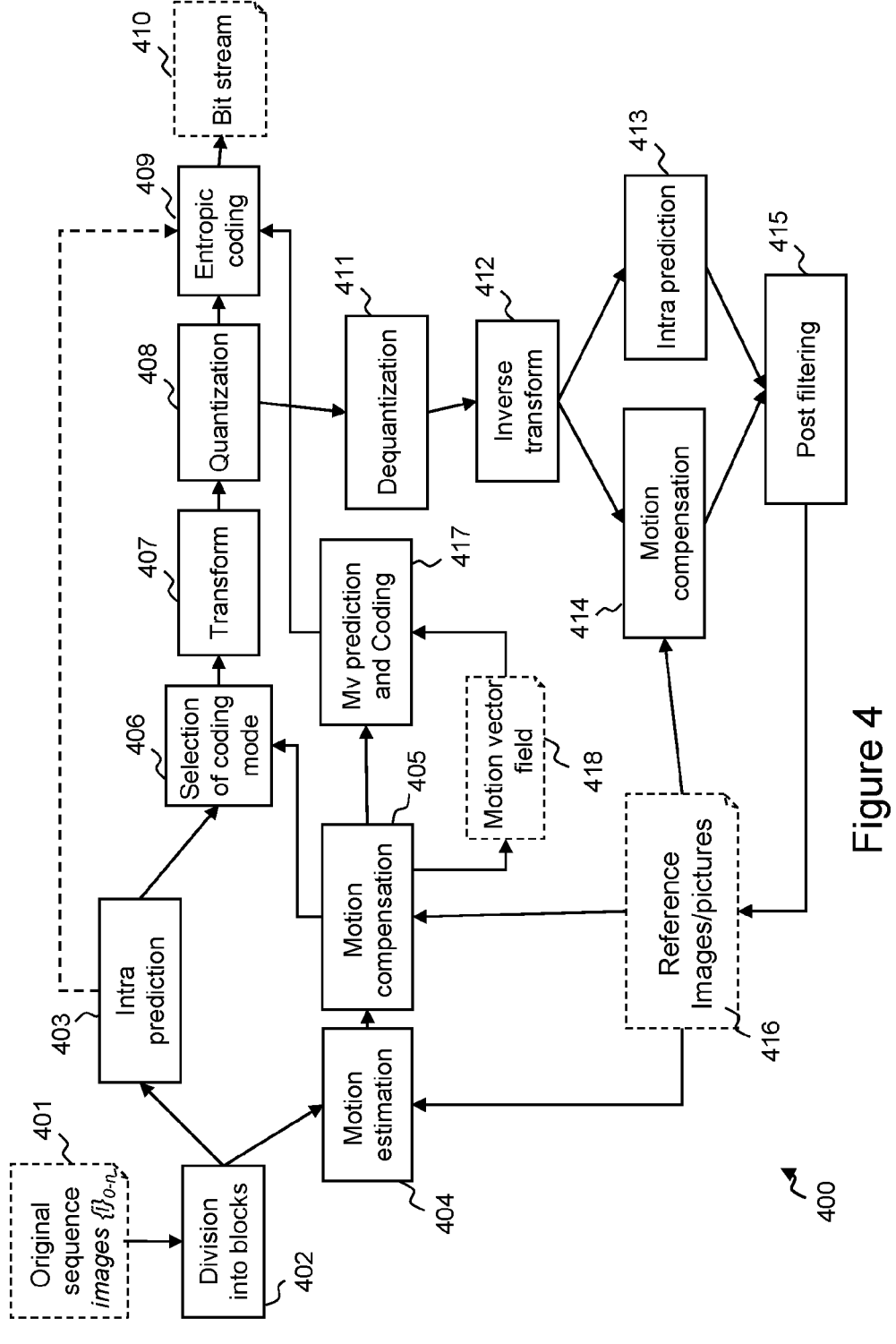
FIG. 4 is a flow chart illustrating steps of an encoding method according to embodiments of the invention.

In this embodiment, the apparatus is a programmable apparatus which uses software to implement the invention. However, alternatively, the present invention may be implemented in hardware (for example, in the form of an Application Specific Integrated Circuit or ASIC). FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, sometimes also referred to as pixels (hereinafter, they are referred to as pixels).

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area (closest in terms of pixel value similarity) to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated using a motion vector.

Thus, in both cases (spatial and temporal prediction), a residual is computed by subtracting the predictor from the original block.

In the INTRA prediction implemented by module 403, a prediction direction is encoded. In the Inter prediction implemented by modules 404, 405, 416, 418, 417, at least one motion vector or data for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image (e.g. those in Reference images/pictures 416) for the motion estimation of the subsequent images. This enables the encoder and the decoder receiving the bitstream to have the same reference frames (reconstructed images or image portions are used). The inverse quantization ("dequantization") module 411 performs inverse quantization ("dequantization") of the quantized data, followed by an inverse transform by inverse transform module 412. The intra prediction module 413 uses the prediction information to determine which predictor to use for a given block and the motion compensation module 414 actually adds the residual obtained by module 412 to the reference area obtained from the set of reference images 416.

Post filtering is then applied by module 415 to filter the reconstructed frame (image or image portions) of pixels. In the embodiments of the invention an SAO loop filter is used in which compensation offsets are added to the pixel values of the reconstructed pixels of the reconstructed image. It is understood that post filtering does not always have to performed. Also, any other type of post filtering may also be performed in addition to, or instead of, the SAO loop filtering.

Figure 5:
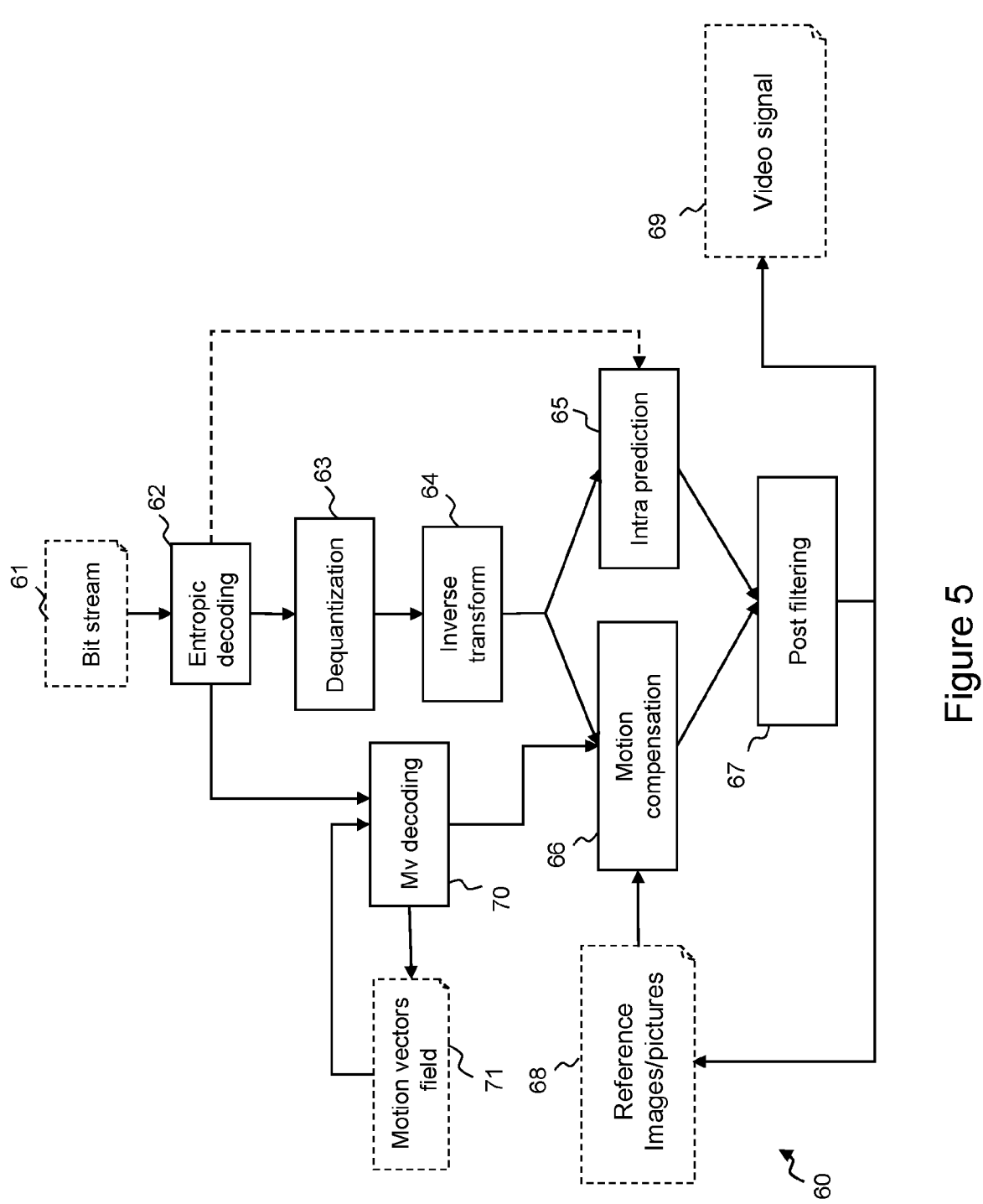
FIG. 5 is a flow chart illustrating steps of a decoding method according to embodiments of the invention.

FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoded units (e.g. data corresponding to a block or a coding unit), each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then an inverse transform is applied by module 64 to obtain pixel values.

The mode data indicating the coding mode are also entropy decoded and based on the mode, an INTRA type decoding or an INTER type decoding is performed on the encoded blocks (units/sets/groups) of image data.

In the case of INTRA mode, an INTRA predictor is determined by intra prediction module 65 based on the intra prediction mode specified in the bitstream.

If the mode is INTER, the motion prediction information is extracted from the bitstream so as to find (identify) the reference area used by the encoder. The motion prediction information comprises the reference frame index and the motion vector residual. The motion vector predictor is added to the motion vector residual by motion vector decoding module 70 in order to obtain the motion vector. The various motion predictor tools used in VVC are discussed in more detail below with reference to FIGS. 6-10.

Motion vector decoding module 70 applies motion vector decoding for each current block encoded by motion prediction. Once an index of the motion vector predictor for the current block has been obtained, the actual value of the motion vector associated with the current block can be decoded and used to apply motion compensation by module 66. The reference image portion indicated by the decoded motion vector is extracted from a reference image 68 to apply the motion compensation 66. The motion vector field data 71 is updated with the decoded motion vector in order to be used for the prediction of subsequent decoded motion vectors.

Finally, a decoded block is obtained. Where appropriate, post filtering is applied by post filtering module 67. A decoded video signal 69 is finally obtained and provided by the decoder 60.

Motion Prediction (INTER) Modes

HEVC uses 3 different INTER modes: the Inter mode (Advanced Motion Vector Prediction (AMVP)), the "classical" Merge mode (i.e. the "non-Affine Merge mode" or also known as "regular" Merge mode) and the "classical" Merge Skip mode (i.e. the "non-Affine Merge Skip" mode or also known as "regular" Merge Skip mode). The main difference between these modes is the data signalling in the bitstream. For the Motion vector coding, the current HEVC standard includes a competitive based scheme for Motion vector prediction which was not present in earlier versions of the standard. It means that several candidates are competing with the rate distortion criterion at encoder side in order to find the best motion vector predictor or the best motion information for respectively the Inter or the Merge modes (i.e. the "classical/regular" Merge mode or the "classical/regular" Merge Skip mode). An index corresponding to the best predictors or the best candidate of the motion information is then inserted in the bitstream, together with a 'residual' which represents the difference between the predicted value and the actual value. The decoder can derive the same set of predictors or candidates and uses the best one according to the decoded index. Using the residual, the decoder can then recreate the original value.

In the Screen Content Extension of HEVC, the new coding tool called Intra Block Copy (IBC) is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy. The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process-for the classical Merge mode and the classical Merge Skip mode). The following describes the various motion predictor modes used in VVC.

Figure 6:
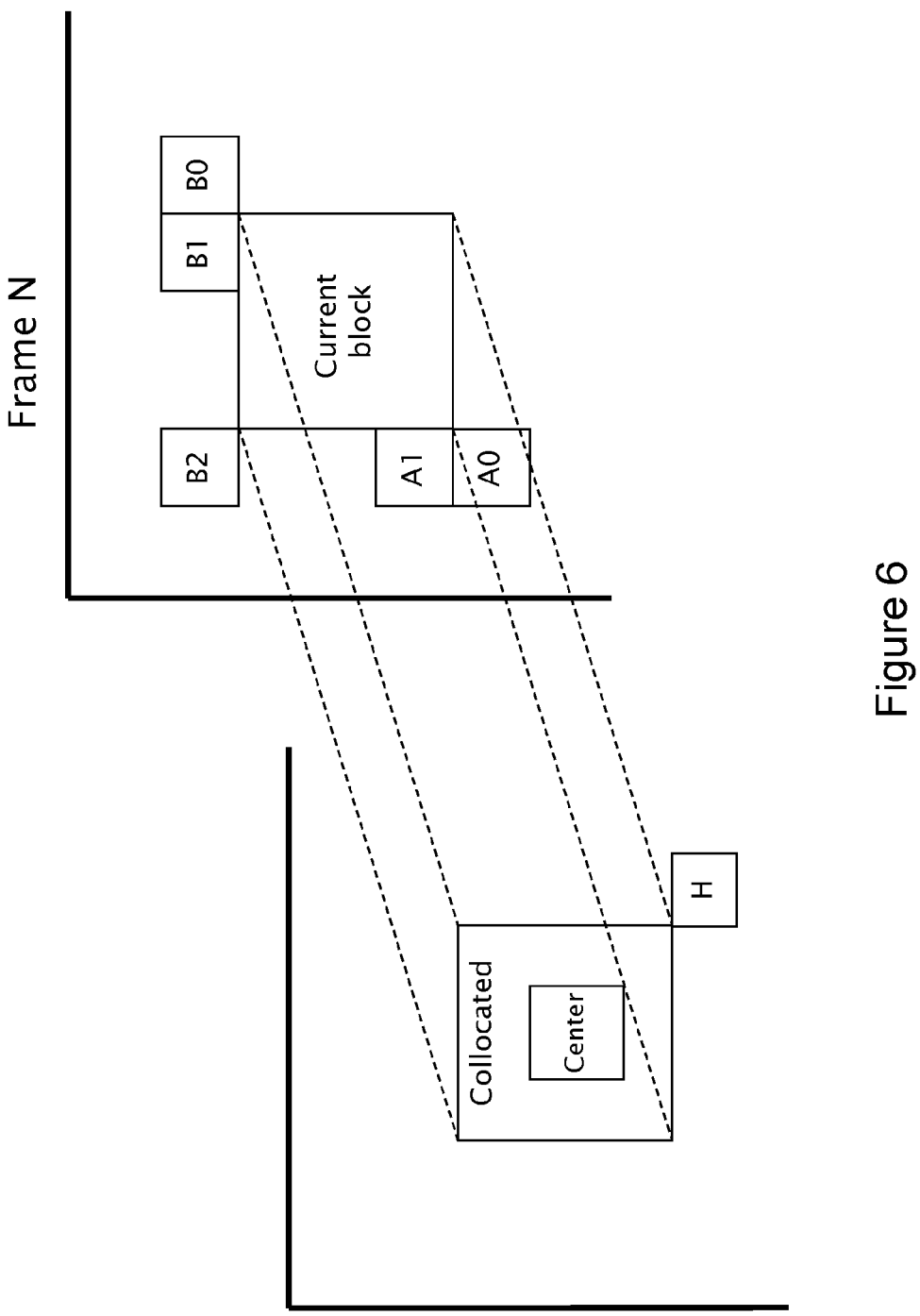
FIGS. 6 and 7 show the labelling scheme used to describe blocks situated relative to a current block.

FIGS. 6 show the labelling scheme used herein to describe blocks situated relative to a current block (i.e. the block currently being en/decoded) between frames (FIG. 6).

VVC Merge Modes

In VVC several inter modes have been added compared to HEVC. In particular, new Merge modes have been added to the regular Merge mode of HEVC.

Affine Mode (SubBlock Mode)

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM.

Figure 8:
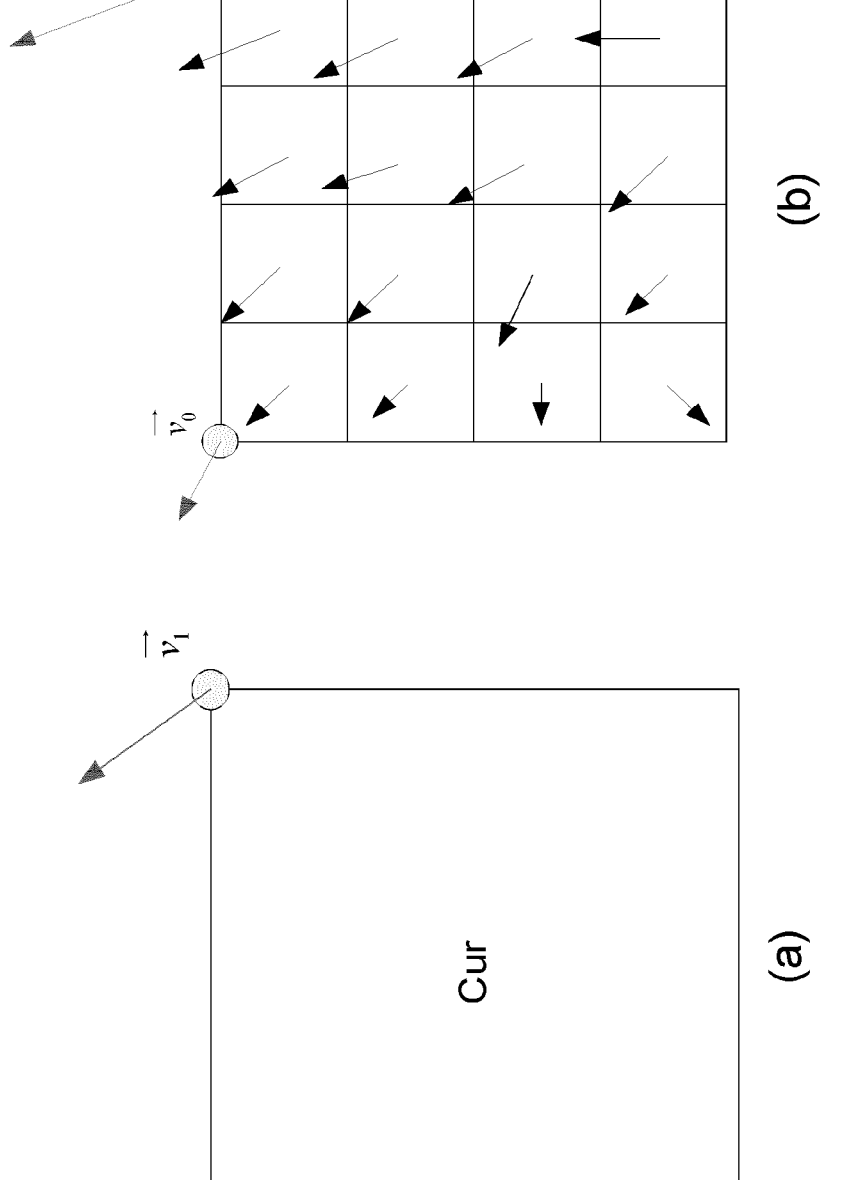
FIGS. 8 (*a*) and (*b*) illustrate the Affine (SubBlock) mode.

As shown in FIG. 8 (a), the affine motion field of the block is described by two control point motion vectors.

The affine mode is a motion compensation mode like the Inter modes (AMVP, "classical" Merge, or "classical" Merge Skip). Its principle is to generate one motion information per pixel according to 2 or 3 neighbouring motion information. In the JEM, the affine mode derives one motion information for each 4×4 block as depicted in FIG. 8 (a) (each square is a 4×4 block, and the whole block in FIG. 8 (a) is a 16×16 block which is divided into 16 blocks of such square of 4×4 size—each 4×4 square block having a motion vector associated therewith). The Affine mode is available for the AMVP mode and the Merge modes (i.e. the classical Merge mode which is also referred to as "non-Affine Merge mode" and the classical Merge Skip mode which is also referred to as "non-Affine Merge Skip mode"), by enabling the affine mode with a flag.

In the VVC specification the Affine Mode is also known as SubBlock mode; these terms are used interchangeably in this specification.

The subblock Merge mode of VVC contains a subblock-based temporal merging candidates, which inherit the motion vector field of a block in a previous frame pointed by a spatial motion vector candidate. This subblock candidate is followed by inherited affine motion candidate if the neighboring blocks have been coded with an inter affine mode of subblock merge and then some as constructed affine candidates are derived before some zero Mv candidate.

CIIP

Figure 10:
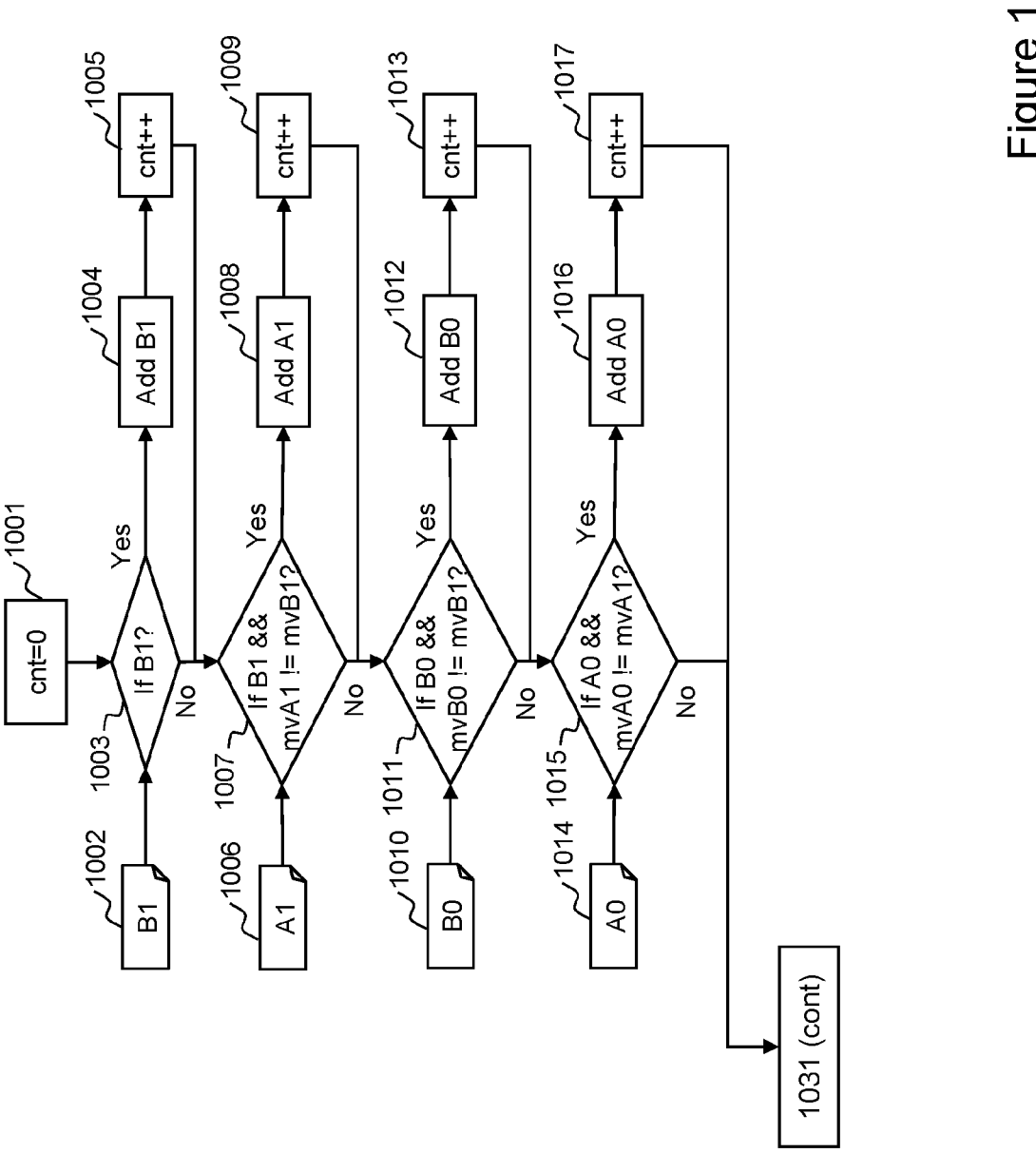
FIG. 10 illustrates the first steps of the Merge candidates list derivation of VVC.
Figure 10:
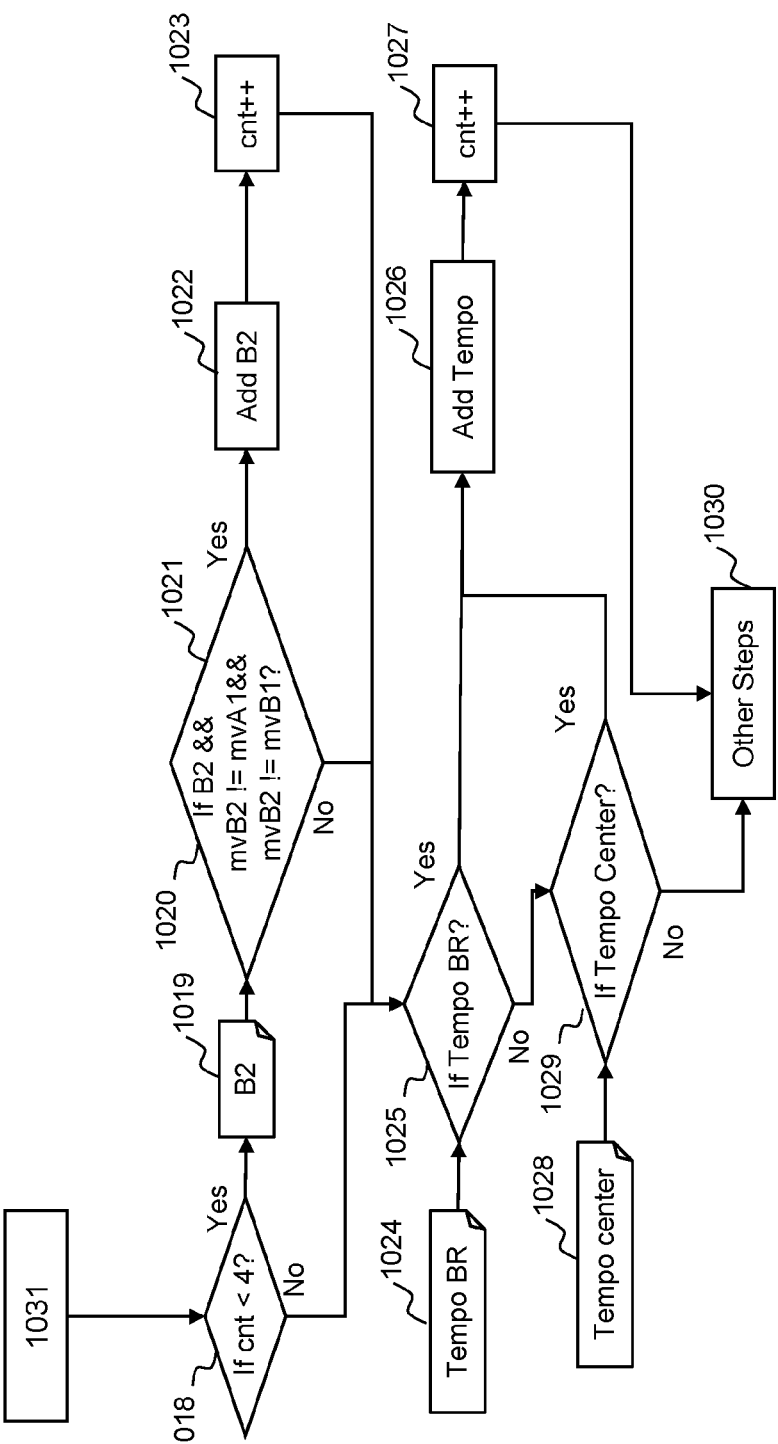

In addition to the regular Merge mode and subblock Merge mode, the VVC standard contains also the Combined Inter Merge/Intra prediction (CIIP) also known as Multi-Hypothesis Intra Inter (MHII) Merge mode The Combined Inter Merge/Intra prediction (CIIP) Merge can be considered as a combination of the regular Merge mode and the Intra mode and is described below with reference to FIG. 10 The block predictor for the current block (1001) of this mode is an average between a Merge predictor block and an Intra predictor block as depicted in FIG. 10. The Merge predictor block is obtained with exactly the same process of the Merge mode so it is a temporal block (1002) or bi-predictor of 2 temporal blocks. As such, a Merge index is signalled for this mode in the same manner as the regular Merge mode. The Intra predictor block is obtained based on the neighbouring sample (1003) of the current block (1001). The amount of available Intra modes for the current block is however limited compared to an Intra block. Moreover, there is no Chroma Intra predictor block signalled for a CIIP block. The Chroma predictor is equal to the Luma predictor. As a consequence, 1, 2 or 3 bits are used to signal the Intra predictor for a CIIP block.

The CIIP block predictor is obtained by a weighted average of the Merge block predictor and the Intra block predictor. The weighting of the weighted average depends on the block size and/or the Intra predictor block selected.

The obtained CIIP predictor is then added to the residual of the current block to obtain the reconstructed block. It should be noted that the CIIP mode is enabled only for non-Skipped blocks. Indeed, use of the CIIP Skip typically results in losses in compression performance and an increase in encoder complexity. This is because the CIIP mode has often a block residual in opposite to the other Skip mode. Consequently its signalling for the Skip mode increases the bitrate—when the current CU is Skip, the CIIP is avoided. A consequence of this restriction is that the CIIP block can't have a residual containing only 0 value as it is not possible to encode a VVC block residual equal to 0. Indeed, in VVC the only way to signal a block residual equal to 0 for a Merge mode is to use the Skip mode, this is because the CU CBF flag is inferred to be equal to true for Merge modes. And when this CBF flag is true, the block residual can't be equal to 0.

In such a way, CIIP should be interpreted in this specification as being a mode which combines features of Inter and Intra prediction, and not necessarily as a label given to one specific mode.

The CIIP used the same Motion vector candidates list as the regular Merge mode.

MMVD

The MMVD MERGE mode is a specific regular Merge mode candidate derivation. It can be considered as an independent Merge candidates list. The selected MMVD Merge candidate, for the current CU, is obtained by adding an offset value to one motion vector component (mvx or mvy) to an initial regular Merge candidate. The offset value is added to the motion vector of the first list L0 or to the motion vector of the second list L1 depending on the configuration of these reference frames (both backward, both forward or forward and backward). The initial Merge candidate is signalled thanks to an index. The offset value is signalled thanks to a distance index between the 8 possible distances (¼-pel, ½-pel, 1-pel, 2-pel, 4-pel, 8-pel, 16-pel, 32-pel) and a direction index giving the x or the y axis and the sign of the offset. In VVC, only the 2 first candidates of the regular Merge list are used for the MMVD derivation and signalling by one flag.

Geometric Partitioning Mode

Figure 9:
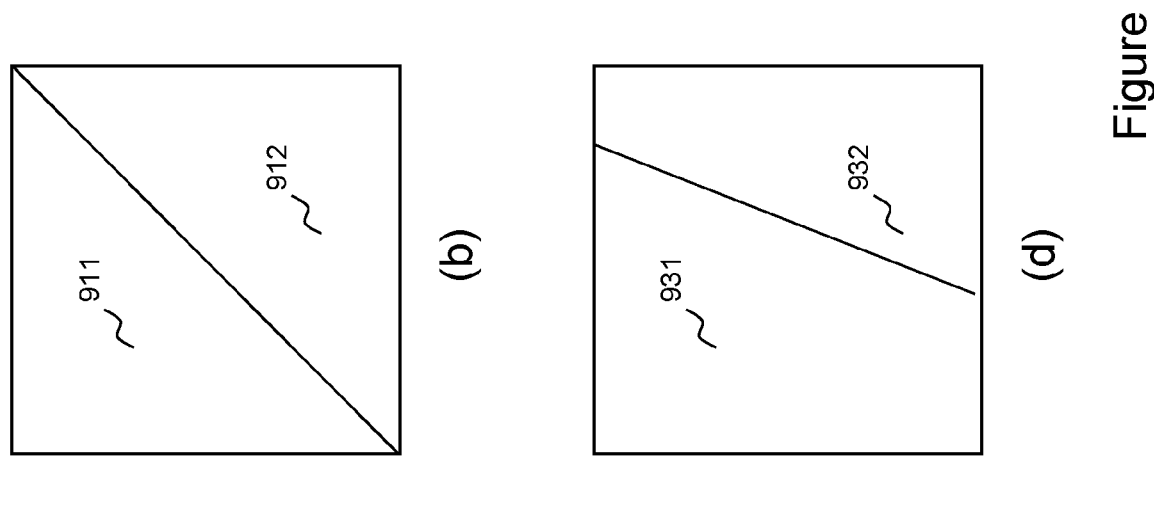
FIGS. 9 (*a*), (*b*), (*c*), (*d*) illustrate the geometric mode.
Figure 9:
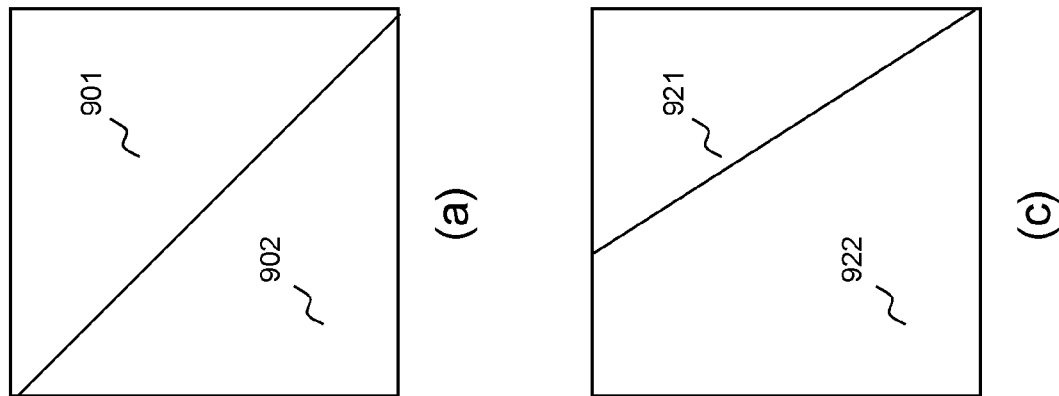

The Geometric (GEO) MERGE mode is a particular bi-prediction mode. FIG. 9 illustrates this particular block predictor generation. The block predictor contains one triangle from a first block predictor (901 or 911) and a second triangle from a second block predictor (902 or 912). But several other possible splits of the block are possible as depicted in FIG. 9 (*c*) and FIG. 9 (*d*). The Geometric Merge should be interpreted in this specification as being a mode which combines features of two Inter non square predictors, and not necessarily as a label given to one specific mode.

Each partition (901 or 902), in the example of FIG. 9 (*a*), has a motion vector candidate which is a unidirectional candidate. And for each partition an index is signalling to obtain at decoder the corresponding motion vector candidate in a list of unidirectional candidates. And the first and the second can't use the same candidate. This list of candidates are the same. As its name indicates, the BDOF mode is based on the optical flow concept, which assumes that the motion of an object is smooth. For each 4×4 subblock, a motion refinement (v_x, v_y) is calculated by minimizing the difference between the L0 and L1 prediction samples. The motion refinement is then used to adjust the bi-predicted sample values in the 4×4 subblock.

PROF

Similarly, Prediction refinement with optical flow (PROF) is used for affine mode.

AMVR and hpelIfIdx

VVC also includes Adaptive Motion Vector Resolution (AMVR). AMVR allows the motion vector difference of the CU to be coded in different precision. For example for AMVP mode: quarter-luma-sample, half-luma-sample, integer-luma-sample or four-luma-sample are considered. The following table of the VVC specification gives the AMVR shift based on different syntax elements.

| | | AmvrShift | | |
|---|---|---|---|---|
| amvr_flag | amvr_precision_idx | inter_affine_ flag[ x0 ] [ y0 ] == 1 | CuPredMode [ chType ] [ x0 ][ y0 ] == MODE_IBC ) | inter_affine_flag[ x0 ][ y0 ] ==0 && CuPredMode[ chType ][ x0 ][ y0 ] != MODE_IBC |
| 0 | — | 2 (¼ luma sample) | — | 2 (¼ luma sample) |
| 1 | 0 | 0 (1/16 luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) | comes from the regular Merge candidates list where for each candidate, one of the 2 components (L0 or L1) have been removed.

IBC

In VVC, it is also possible to enable the Intra block Copy (IBC) merge mode. IBC has an independent merge candidate derivation process.

Other Motion Information Improvements

DMVR

The decoder side motion vector derivation (DMVR), in VVC, increases the accuracy of the MVs of the Merge mode. For this method, a bilateral-matching (BM) based decoder side motion vector refinement is applied. In this bi-prediction operation, a refined MV is searched around the initial MVs in the reference picture list L0 and reference picture list L1. The BM method calculates the distortion between the two candidate blocks in the reference picture list L0 and list L1.

BDOF

VVC integrates also a bi-directional optical flow (BDOF) tool. BDOF, previously referred to as BIO, is used to refine the bi-prediction signal of a CU at the 4×4 subblock level. BDOF is applied to a CU if it satisfies several conditions, especially if the distances (i.e. Picture Order Count (POC) difference) from two reference pictures to the current picture AMVR can have an impact on the coding of the other modes than those using motion vector differences coding as the different Merge mode. Indeed, for some candidates the parameter hpelIfIdx, which represent an index on the luma interpolation filter for half pel precision, is propagated for some Merge candidate. For AMVP mode, for example, the hpelIfIdx is derived as follows:

hpelIfIdx=AmvrShift==3?1:0

Bi-Prediction With CU-Level Weight (BCW)

In VVC, the bi-prediction mode with CU-level weight (BCW) is extended beyond simple averaging (as performed in HEVC) to allow weighted averaging of the two prediction signals $P_0$ and $P_1$ according to the following formula.

$$P_{bi\text{-}pred} = ((8 - w) * P_0 + w * P_1 + 4) >> 3$$

Five weights are allowed in the weighted averaging bi-prediction, where $w \in \{-2, 3, 4, 5, 10\}$.

For a non-merge CU, the weight index, bcwIndex, is signalled after the motion vector difference.

For a Merge CU, the weight index is inferred from neighbouring blocks based on the merge candidate index.

BCW is used only for CUs with 256 or more luma samples. Moreover, for low-delay pictures, all 5 weights are used. And for non-low-delay pictures, only 3 weights (w∈ {3,4,5}) are used.

Regular Merge List Derivation

Figure 7:
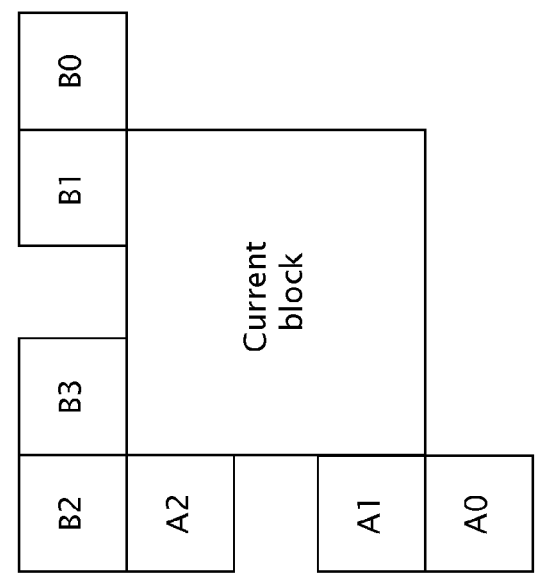
Figure 11:
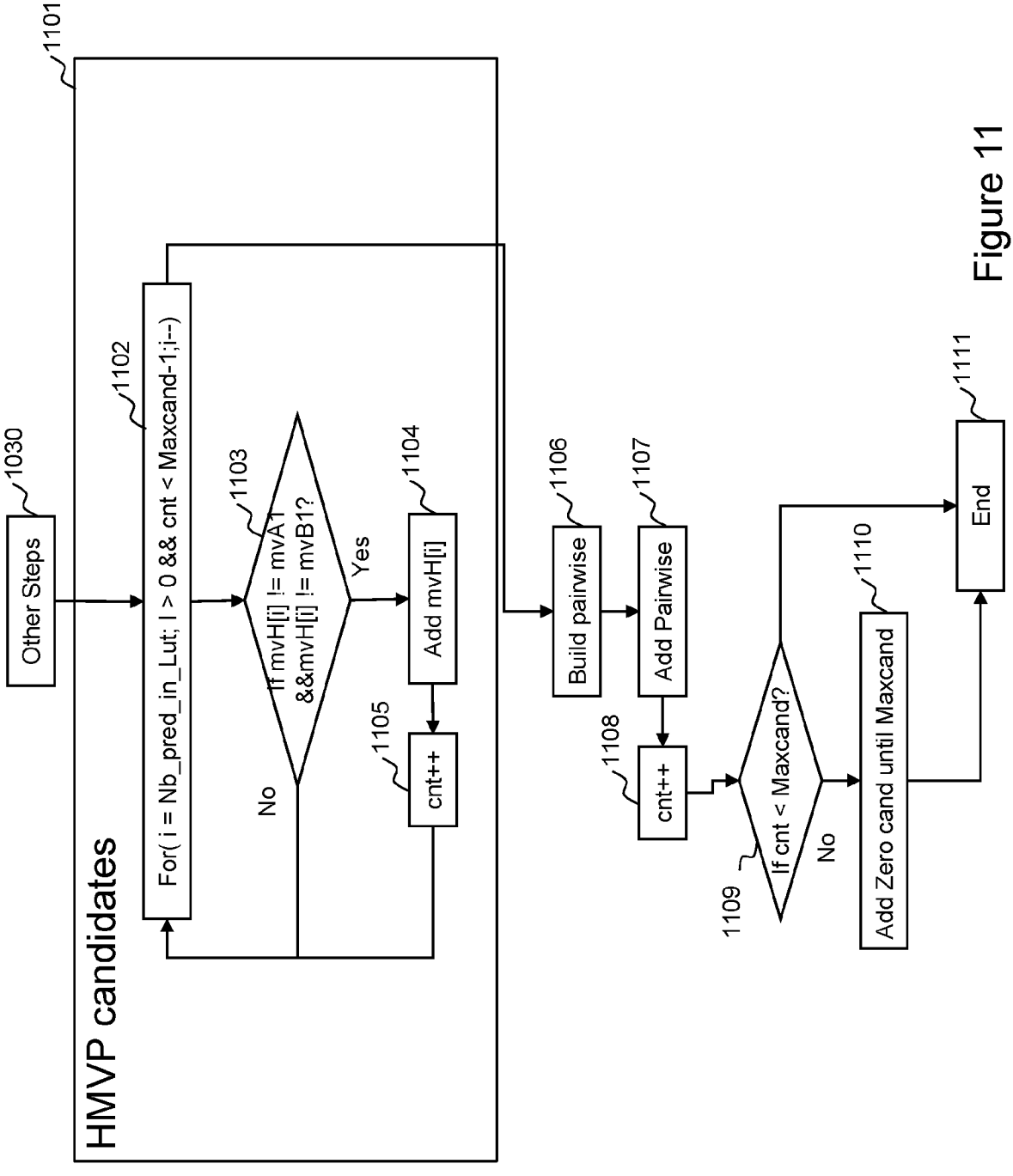
FIG. 11 illustrates further steps of the Merge candidates list derivation of VVC.

In VVC, the regular Merge list is derived as in FIG. 10 and FIG. 11. First the spatial candidates B1 (1002), A1 (1006), B0 (1010), A0 (1014) (as depicted in FIG. 7) are added if they exist. And a partial redundancies are performed, between the motion information of A1 and B1 (1007) to add A1 (1008), between the motion information of B0 and B1 (1011) to add B0 (1012) and between the motion information of A0 and A1 (1015) to add A0 (1016).

When a Merge candidate is added, the variable cnt is incremented (1015, 1009, 1013, 1017, 1023, 1027, 1115, 1108).

If the number of candidates in the list (cnt) is strictly inferior to 4 (1018), the candidate B2 (1019) is added (1022) if it has not the same motion information as A1 and B1 (1021).

Then the temporal candidate is added. The bottom right candidate (1024), if it is available (1025) is added (1026), otherwise the center temporal candidate (1028) is added (1026) if it exists (1029).

Then the history based (HMVP) are added (1101), if they have not the same motion information as A1 and B1 (1103). In addition the number of history based candidates can't exceed the maximum number of candidates minus 1 of the Merge candidates list (1102). So after the history based candidates there is at least one position missing in the merge candidates list.

Then, if the number of candidate in the list is at least 2, the pairwise candidate is build (1106) and added in the Merge candidates list (1107).

Then if there are empty positions (1109) in the Merge candidates list, the zero candidates are added (1110).

For spatial and history-based candidates, the parameters the parameters BCWidx and useAltHpelIf are set equal to the related parameters of the candidates. For temporal and zero candidates they are set equal to the default value, 0. These default values in essence disable the method.

For the pairwise candidate, BCWidx is set equal to 0 and hpelIfIdxp is set equal to the hpelIfIdxp of the first candidate if it is equal to the hpelIfIdxp of the second candidate, and to 0 otherwise.

Pairwise Candidate Derivation

Figure 12:
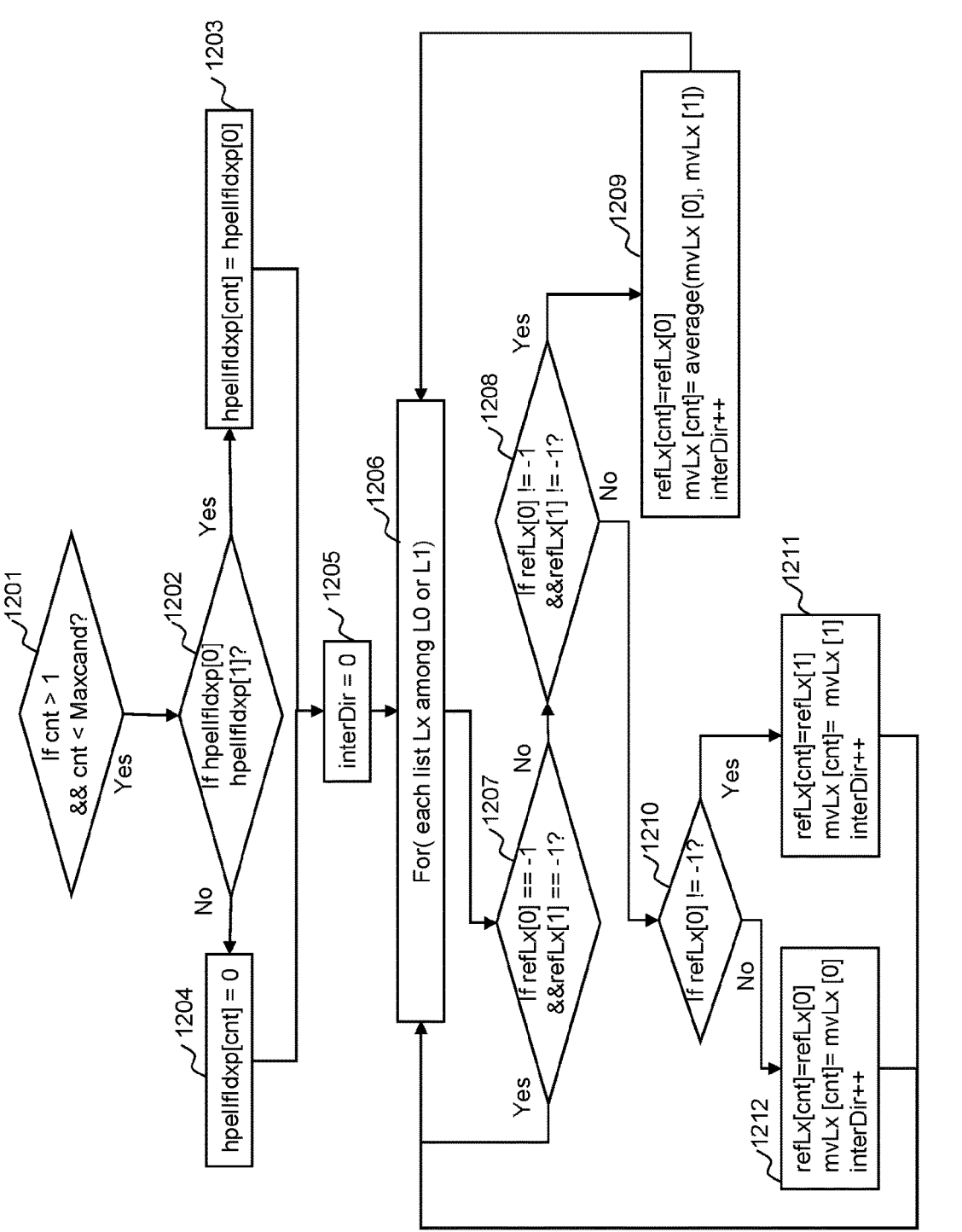
FIG. 12 illustrates the derivation of a pairwise candidate.

The pairwise candidate is built (1106) according to the algorithm of FIG. 12. As depicted, when 2 candidates are in the list (1201), the hpelIfIdxp is derived as mentioned previously (1204, 1202, 1203). Then the inter direction (interDir) is set equal to 0 (1205). For each list, L0 and L1, If at least one reference frame is valid (different to −1) (1207), the parameters will be set. If both are valid (1208), the mv information for this candidate is derived (1209) and set equal to the reference frame of the first candidate and the motion information is the average between the 2 motion vectors for this list and the variable interDir is incremented. If only one of the candidates has motion information for this list (1210), the motion information for the pairwise candidate is set equal to this candidate (1212, 1211) and the inter direction variable interDir is incremented.

ECM

Since the end of the standardization of VVC v1, JVET has launched an exploration phase by establishing an exploration software (ECM). It gathers additional tools and improvements of existing tools on top of the VVC standard to target better coding efficiency.

ECM Merge Modes

Among all tools added, some additional Merge modes have been added. The Affine MMVD signal offsets for the Merge affine candidate as the MVVD coding for the regular Merge mode. Similarly, the GEO MMVD was also added. The CIIP PDPC is an extension of the CIIP. And 2 template matching Merge mode have been added: the regular template matching and the GEO template matching.

Figure 13:
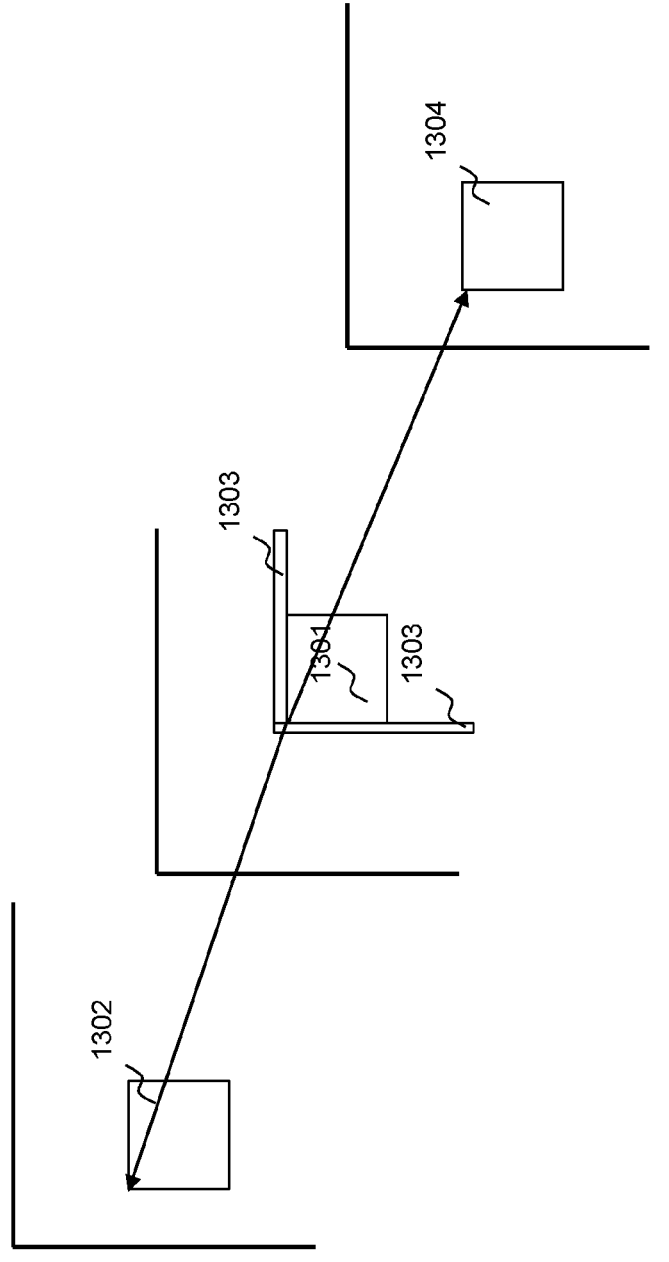
FIG. 13 illustrates the template matching method based on neighbouring samples.

The regular template matching is based on the template matching estimation as depicted in FIG. 13. At decoder side, for the candidate corresponding to the related Merge index and for both lists (L0, L1) available, a motion estimation based on the neighboring samples of the current block (1301) and based on the neighboring samples of the multiple corresponding block positions, a cost is computed and the motion information which minimized the cost is selected. The motion estimation is limited by a search range and several restrictions on this search range are also used to reduce the complexity In the ECM, the regular template matching candidates list is based on the regular Merge list but some additional steps and parameters have been added which means different Merge candidates lists for a same block may be generated. Moreover, only 4 candidates are available for the template matching regular Merge candidates list compared to the 10 candidates for the regular Merge candidates list in the ECM with common tests conditions defined by JVET.

Regular Merge List Derivation in ECM

Figure 14:
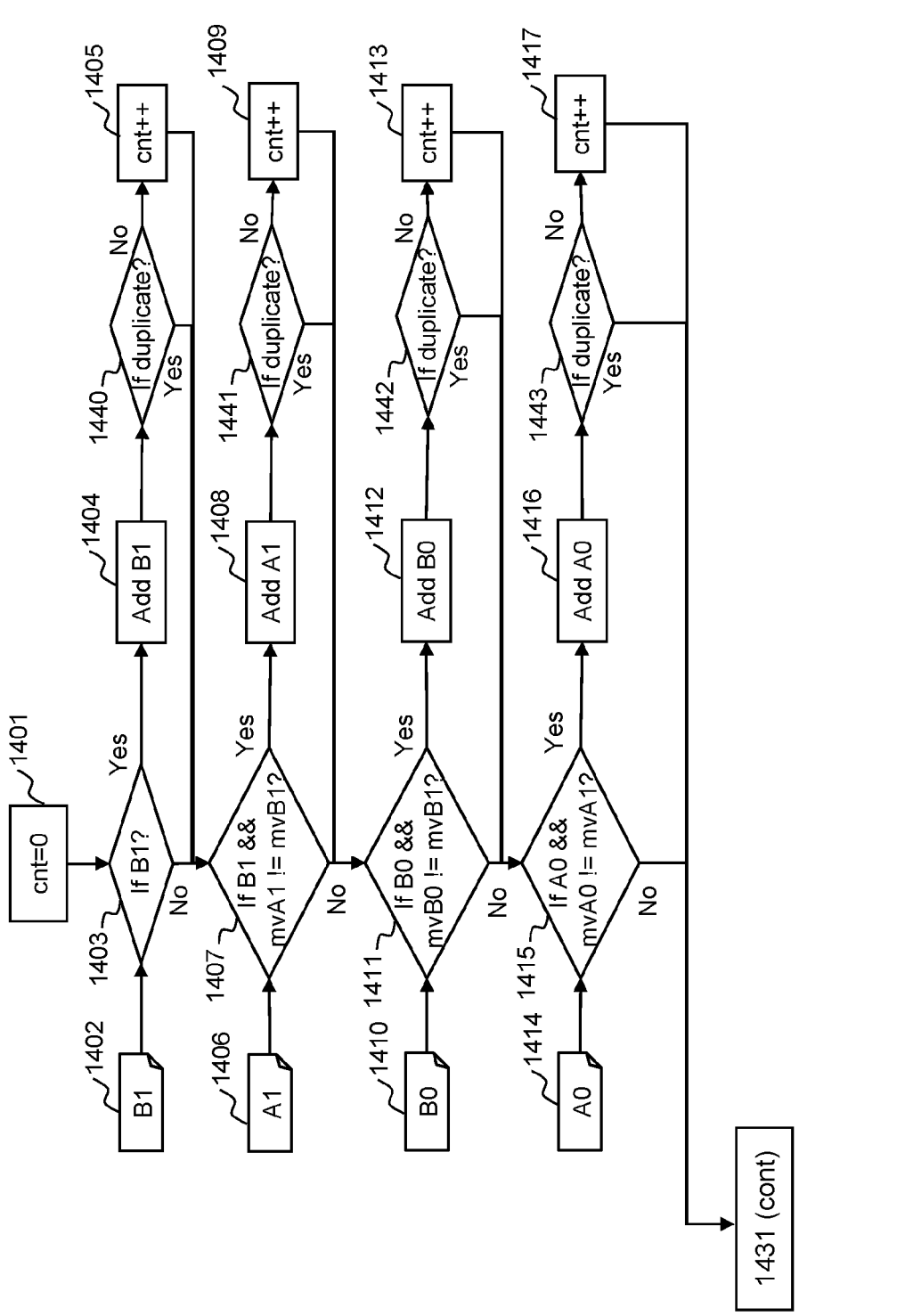
FIG. 14 illustrates a modification of the first steps of the Merge candidates list derivation shown in FIG. 10.
Figure 14:
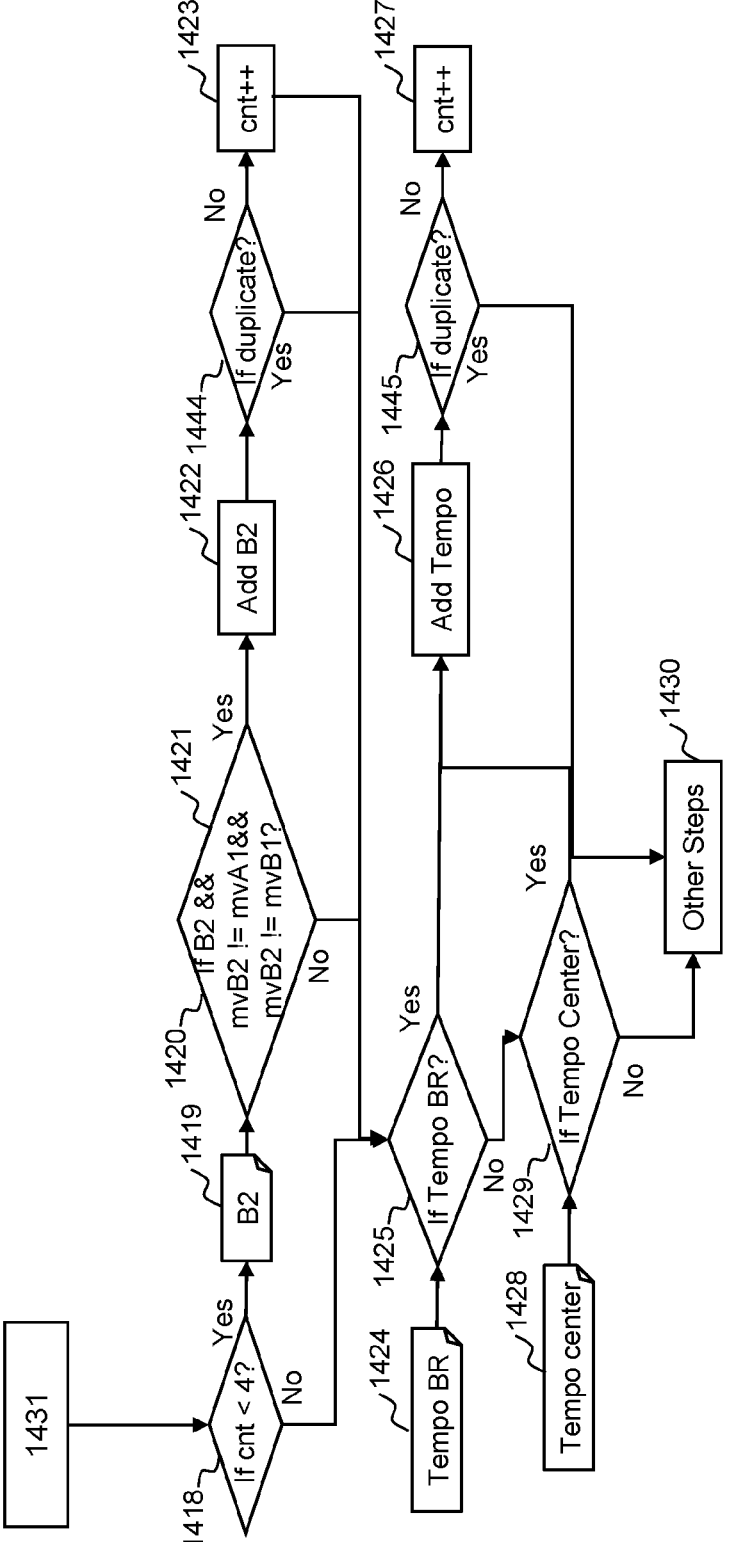
Figure 15:
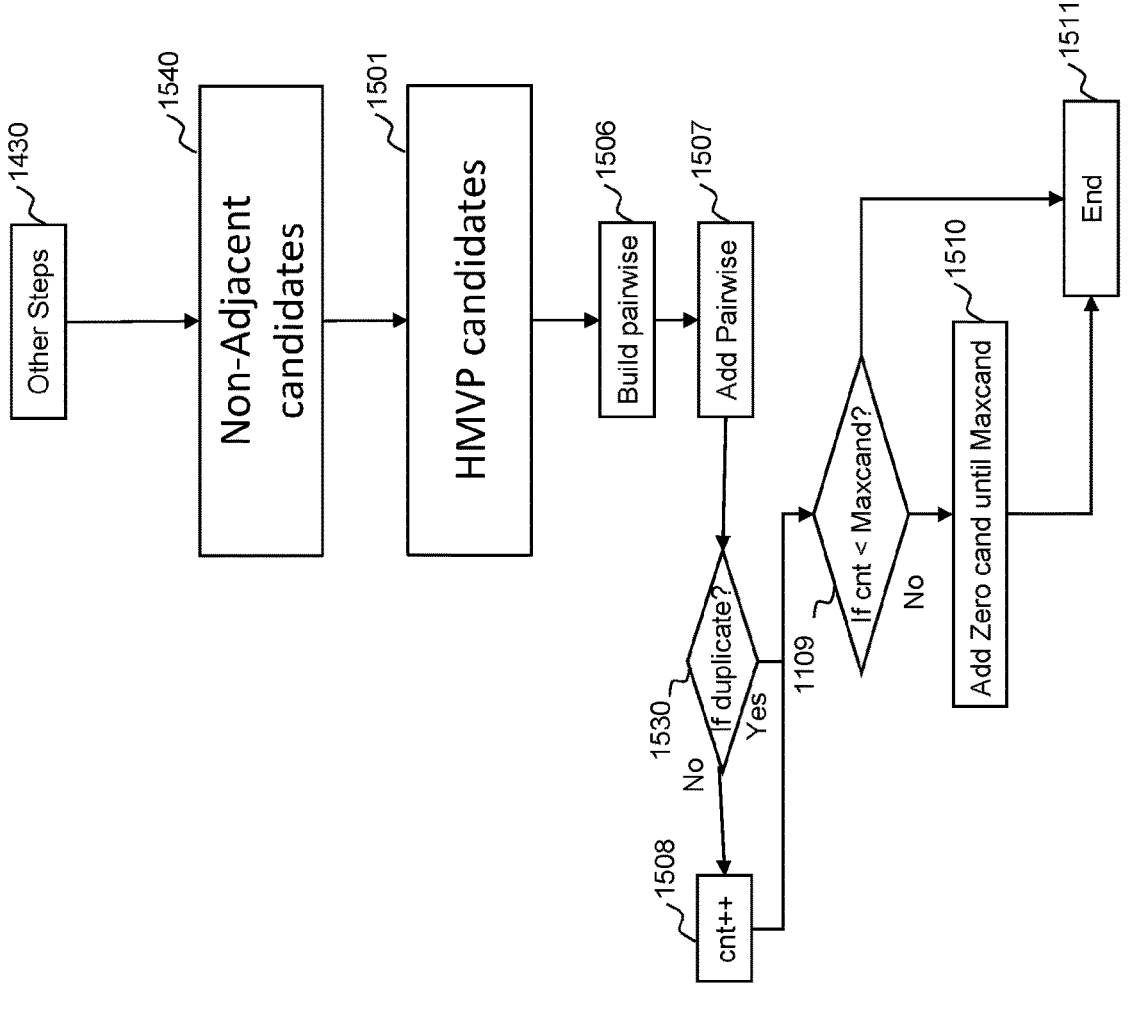
FIG. 15 illustrates a modification of the further steps of the Merge candidates list derivation shown in FIG. 11.

In the ECM, the regular Merge list derivation have been updated. FIGS. 14 and 15 show this update based on respectively FIGS. 10 and 11. But for clarity, the module for the history based candidates (1101) have been summarized in (1501).

In this FIG. 15, a new type of merge candidates has been added: the non-adjacent candidates (1540). These candidates come from blocks spatially located in the current frame but not the adjacent ones, as the adjacent are the spatial candidates. They are selected according to a distance and a direction. As for the history based the list of adjacent candidates can be added until that the list reaches the maximum number of candidate minus 1, in order that the pairwise can still be added.

Duplicate Check

In FIGS. 14 and 15, a duplicate check for each candidate was added (1440, 1441, 1442, 1443, 1444, 1445, and 1530). But, the duplicate is also for the Non-adjacent candidates (1540) and for the history based candidates (1501). It consists in comparing the motion information of the current candidate of the index cnt to the motion information of each other previous candidates. When this motion information is equal, it is considered as duplicate and the variable cnt is not incremented. Of course the motion information means inter direction, reference frame indexes and motion vectors for each list (L0, L1).

MVTH

In the ECM, for this duplicate check a motion vector threshold was added. This parameter changes the equality check by considering that 2 motion vectors are equal if their absolute difference, for each component, is in inferior or equal to the motion vector threshold MvTh. For the regular Merge mode the MvTh is set equal to 0 and to a value which depends on the number of luma samples in the current CU for the template matching regular Merge mode

AMRC

In the ECM, in order to reduce the number of bits for the Merge index, an Adaptive Reordering of Merge Candidates with Template Matching (AMRC) was added. According to the template matching cost computed as in FIG. 13, the candidates are reordered based on the cost of each candidate. In this method only one cost is computed per candidate. This method is applied after that this list has been derived and only on the 5 first candidates of the regular Merge candidates list. It should be appreciated that the number 5 was chosen to balance the complexity of the reordering process with the potential gains, and as such a greater number (e.g. all of the candidates) may be reordered.

Figure 18:
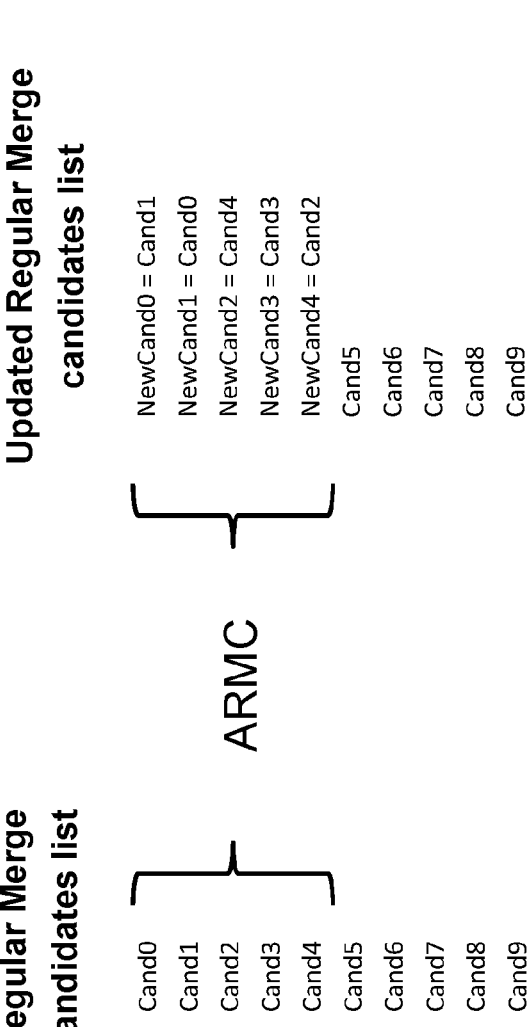
FIG. 18 illustrates the reordering process of the list of merge mode candidates.

FIG. 18 gives an example of this method on a regular Merge candidate list containing 10 candidates as in the CTC.

This method is also applied on the subblock merge mode except for the temporal candidate and on for the regular TM mode for all of the 4 candidates.

In a proposal, this method was also extended to reorder and select a candidates to be included in the final list of Merge mode candidates. For example, in JVET-X0087, all possible non-adjacent candidates (1540) and History based candidates (1501) are considered with temporal non-adjacent candidates in order to obtain a list of candidates. This list of candidates is built without considering the maximum number of candidates. This list candidates is then reordered. Only a correct number of candidates from this list are added to the final list of Merge candidates. The correct number of candidates corresponding to the first N candidates in the list. In this example, the correct number is the maximum number of candidates minus the number of spatial and temporal candidates already in the final list. In other words, the non-adjacent candidates and History based candidates are processed separately from the adjacent spatial and temporal candidates. The processed list is used to supplement the adjacent spatial and temporal Merge candidates already present in the Merge candidate list to generate a final Merge candidate list.

In JVET-X0091, ARMC is used to select the temporal candidate from among 3 temporal candidates bi-dir, L0 or L1. The selected candidate is added to the Merge candidate list.

In JVET-X0133, the Merge temporal candidate is selected from among several temporal candidates which are reordered using ARMC. In the same way, all possible Adjacent candidates are subject to ARMC and up to 9 of these candidates can be added to the list of Merge candidates.

All these proposed methods use the classical ARMC reordering the final list of merge candidates to reorder it. JVET X0087 re-uses the cost computed during the reordering of the non-adjacent and History based candidates, to avoid additional computation costs. JVET-X0133 applies a systematic reordering on all candidates on the final list of merge candidates.

Multiple Hypothesis Prediction (MHP)

The Multiple Hypothesis Prediction (MHP) was also added in the ECM. With this method it is possible to use up to four motion-compensated prediction signals per block (instead of two, as in VVC). These individual prediction signals are superimposed in order to form the overall prediction signal. The motion parameters of each additional prediction hypothesis can be signalled either explicitly by specifying the reference index, the motion vector predictor index, and the motion vector difference, or implicitly by specifying a Merge index. A separate multi-hypothesis Merge flag distinguishes between these two signalling modes.

For spatial candidates, non-adjacent Merge candidates and history based Merge candidates, the multiple hypothesis parameters values 'addHypNeighbours' are inherited from the candidate.

For temporal candidates, and zero candidate and pairwise candidate, the multiple hypothesis parameters values 'addHypNeighbours' are not keep (they are clear).

LIC

In the ECM, the Local Illumination Compensation (LIC) have been added. It is based on a linear model for illumination changes. The linear model is computed thanks to neighboring samples of the current block and the neighboring sample of the previous blocks.

In the ECM, LIC is enabled only for unidirectional prediction. LIC is signaled by way of a flag. For the Merge modes no LIC flag is transmitted but instead the LIC flag is inherited from the merge candidates in the following manner.

For spatial candidates, Non-adjacent merge candidates and history-based Merge candidates the value of the LIC flag is inherited.

For temporal candidates, and zero candidates the LIC flag is set equal to 0.

Figure 16:
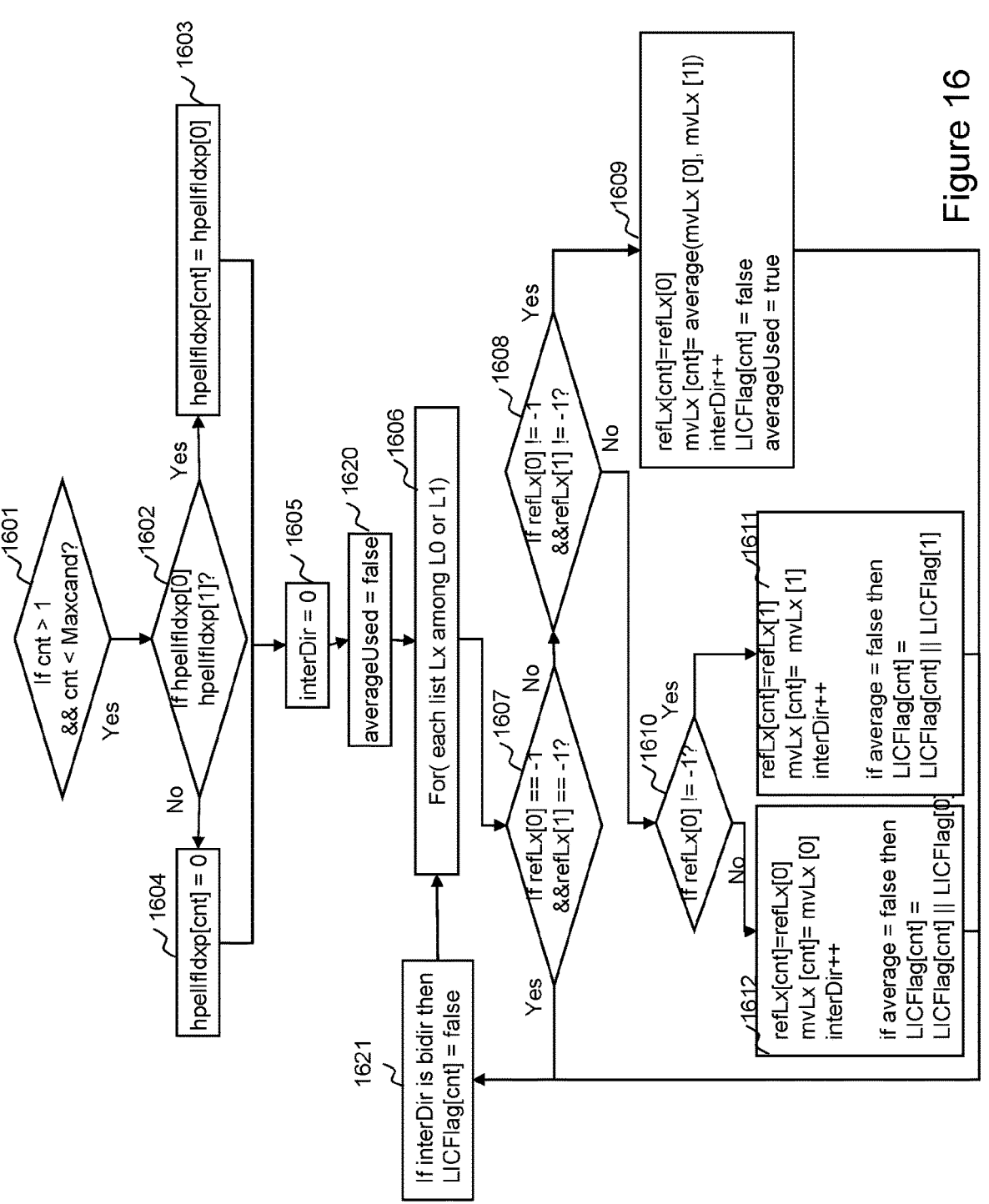
FIG. 16 illustrates a modification of the derivation of a pairwise candidate shown in FIG. 12.

For pairwise candidates, the value of the LIC flag it is set as depicted in FIG. 16. This figure is based on FIG. 12 and modules 1620 and 1621 have been added and modules 1609, 1612 and 1611 have been updated. A variable average is set equal to false (1620), if for the current list the average for the pairwise have been computed the LIC flag for the pairwise LICFlag[cnt] is set equal to false and the variable averageUsed equals to true (1609). If only candidate have a motion information for the list (1612 1611) the LIC flag is updated if the average wasn't used. And it is set equal to a OR operation with its current value and the value of the LICflag of the candidate.

And when the pairwise candidate is Bidir (e.q. equal 3) the LIC flag is equal to false.

However, the algorithm as shown in FIG. 16 only allows the LICflag to be equal to something different to true if the 2 candidates have motion information for one list and each candidate has its own list. For example, the candidate 0 has motion information for L 0 only and Candidate 1 has motion information for L1 only. In that case the LIC flag can be equal to something else different to 0 but as LIC is only for uni-direction it will never happen. So the LIC flag for the pairwise is always equal to false. Consequently the pairwise candidate can't use LIC when it is potentially needed. So this reduces the efficiency of the candidate and avoid the propagation of LIC for the following coded blocks and consequently decreases the coding efficiency.

Furthermore, the duplicate check in the ECM software introduces some inefficiencies. As depicted in FIG. 14 and FIG. 15, each candidate is added in the list and the duplicate check (1440, 1441, 1442, 1443, 1444, 1445, and 1530) has an impact only on the increment of the variable cnt (1405,

1409, 1413, 1417, 1423, 1427, 1508). In addition, as described in FIG. 16, the variable BCWidx is not initialized for the pairwise candidate. Consequently, if the last candidate added in the list was a duplicate candidate, the value BCWidx for the pairwise candidate is the value of this previous duplicate candidate. This was not the case in VVC as candidates are not added when they are considered as duplicate.

EMBODIMENTS

In all following embodiments, a pairwise candidate can be generated between 2 or more candidates. The pairwise candidate can represent a 'compromise' position between the candidates which generated it and as such represent a refinement towards the ideal motion vector predictor. Exploiting this (when appropriate) can lead to efficiency gains by:

a) selecting the most appropriate candidates to generate a pairwise candidate;
 b) only using pairwise candidates when appropriate as they take a spot of a candidate which would otherwise provide greater diversity;
 c) placing the pairwise candidate in the most appropriate place in the list;
 d) realizing when a pairwise candidate might be useful, or is too similar to an existing candidate; and
 e) deriving other (non-motion) parameters for the candidate based on the candidates which generated it.

Such modifications, particularly when combined, can lead to efficiency gains without a significant complexity cost. The following describes various embodiments which relate to one or more of the above.

In one embodiment, when a duplicate check, which changes only the number of candidates in the list is applied before the pairwise candidate, a non-motion parameter (for example the BCWidx value) of the pairwise is set equal to a default value 0. This ensures that non-motion parameters are not inherited from an unrelated or inappropriate candidate.

Regular Merge Mode

In on embodiment, when generating a list of motion vector candidates, the pairwise candidate is enabled in dependence on the type of merge mode. In particular a pairwise candidate is added only when the merge mode is Regular Merge mode. This can include the CIIP Merge mode and MMVD. The pairwise candidate is an efficient candidate, as it is a combination or an average between the most probable candidates. So this candidate creates diversity for predictable content and can be closer to the ideal candidate in that case. (Ideal candidate means the candidate which gives the perfect prediction of the current block. It is quite unlikely to exist in a lossy codec.) The other Merge modes are dedicated to specific complex content as Geo and or exploit some correlations between samples as the template matching. For template matching, the pairwise candidate doesn't create enough diversity as the candidate should be far between them, instead of being closer, as the template matching find the correct position in a search range. The Geo Merge mode is designed to split correctly block between 2 motions present in the neighborhood. The pairwise candidate creates a motion information which is not in this neighborhood. So this diversity is not needed for Geo Merge mode.

Template Matching Merge Mods

The dependence on the type of merge mode could also/alternatively be disabling (or not adding) the pairwise candidate for the template matching Merge mode. This surprisingly increases the coding efficiency. Indeed, when the pairwise is an average it creates a position between 2 candidates. So it will produce too close areas for the template matching Merge mode and this candidate is unlikely to differ significantly from other candidates to produce better prediction than the other candidates in template matching Merge mode.

A related embodiment is to disable (or not add) the pairwise candidate for template matching Merge mode when the pairwise candidate is an average between candidates.

GEO Merge Mode

In a similar embodiment which is usefully combined with the above, the pairwise candidate is disabled (or not added) for the geometric Merge mode or geometric MMVD Merge mode, or geometric template matching Merge mode. As above, this ensures the list has diversity between the candidates for several Merge modes and consequently increases the coding efficiency In a similar manner to the template matching Merge mode, the pairwise candidate is disabled (or not added) for the all geometric Merge modes when it is an average between candidates.

Position of the Pairwise Candidate in the Merge List

Surprisingly, it has been found that the pairwise candidate is very frequently selected in VVC, even when near the bottom of the list. Thus, it has been found to increase coding efficiency by setting the Pairwise candidate at an early stage of the Merge candidates list. Indeed, the Merge candidate list contains at the beginning of the list the most probable candidates. So a combination of these most probable candidates gives an interesting candidate in average closest to the ideal candidate compared to other candidates.

In this embodiment, the loosest restriction on the pairwise candidate is to not place this candidate at the end of Merge candidate list. Consequently the constraint is (cnt<Maxcand−1) where cnt is the position of the candidate (starting from zero) and Maxcand is the total number of candidates. Non adjacent candidates and/or on history based candidate (1102) can be removed so these candidates can be added until the end of the list.

A stricter constraint on the position of the pairwise candidate would be to enforce that the position is closer to the top of the list than the bottom. In mathematical terms, this constraint can be expressed as (cnt<(Maxcand−1)/2). In an example where Maxcand=10, cnt could be 0, 1, 2, 3, or 4 (i.e. in the top half of the list).

In one additional embodiment, the pairwise is set just after the last candidate used to define it. As the pairwise candidate is an average, or combination of two candidates, it is likely that if the originating motion vector predictor candidates are not selected, a position between them might be better (and thus selected).

An example implementation of this would be to set the position of the pairwise motion vector predictor candidate at the third position (i.e. immediately after the two candidates used to generate the pairwise candidate).

23                                                                  24

Figure 17:
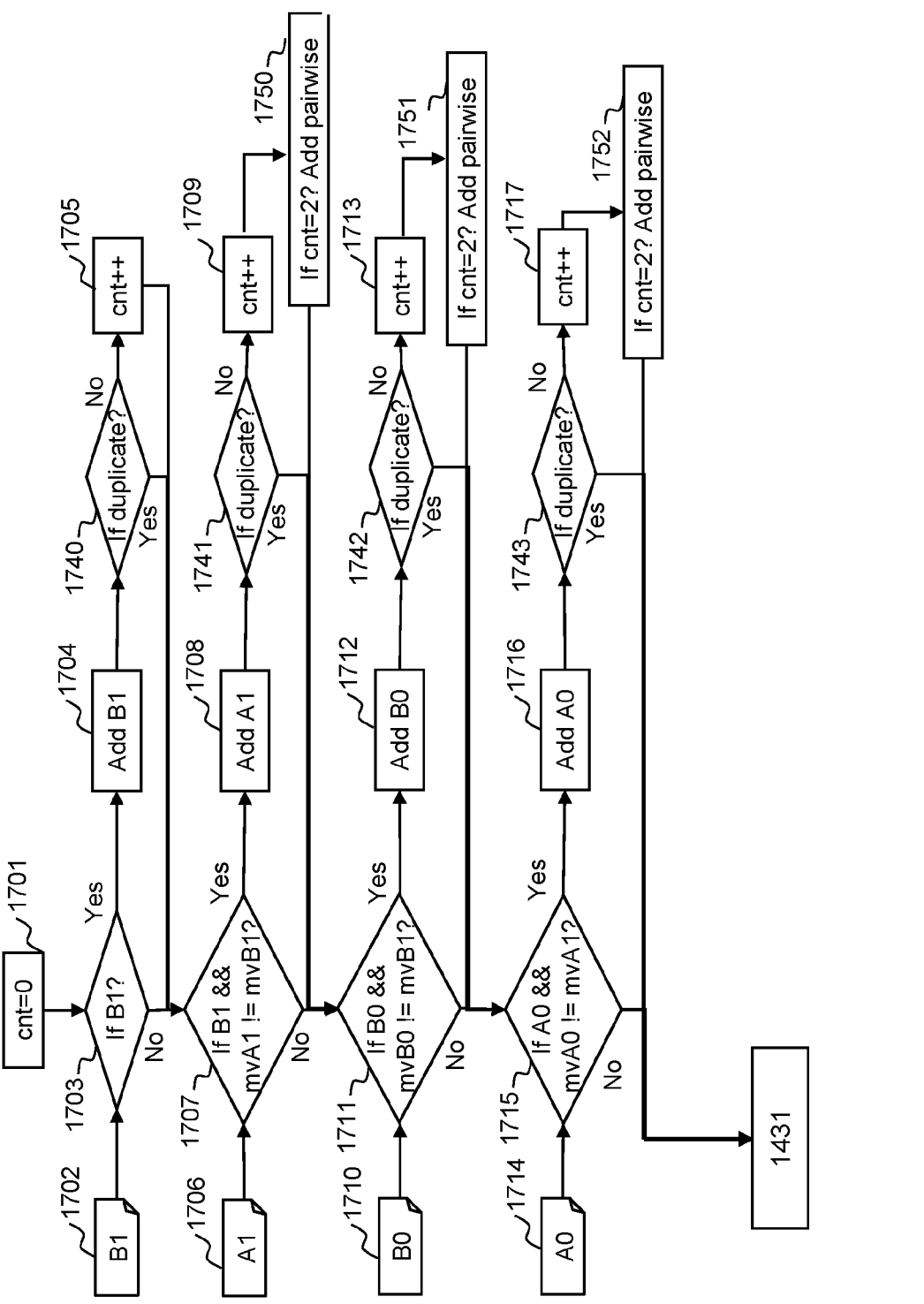
FIG. 17 illustrates the first steps of the Merge candidates list derivation.
Figure 17:
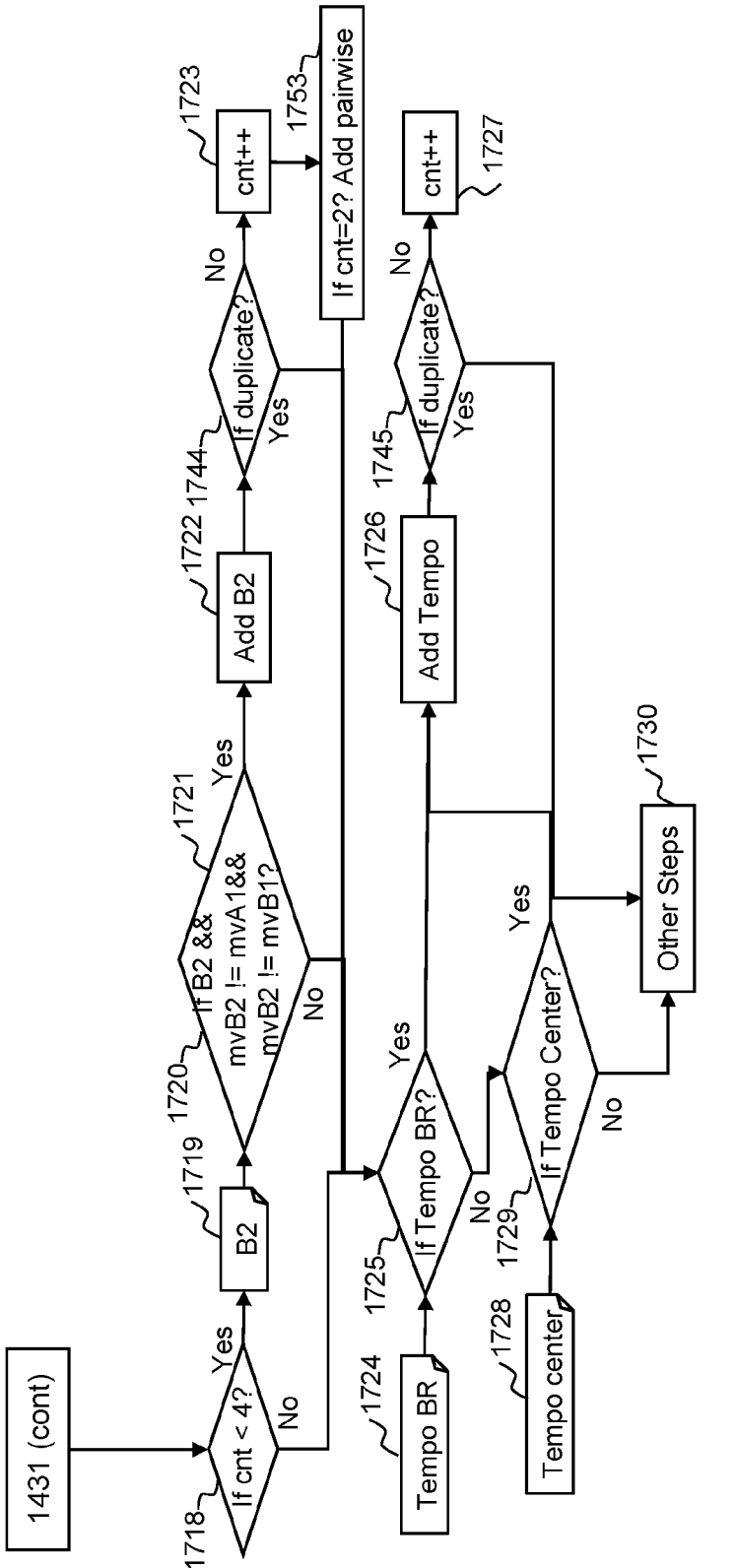

A similar, but alternative additional implementation is to add the pairwise candidate in the list once 2 candidates have been obtained. FIG. 17 illustrates this embodiment. It is based on FIG. 14 in which the modules 1750, 1751, 1752 and 1753 are added. This method requires minimal modification of the existing method and ensures the pairwise candidate is placed as high up the list as is appropriate.

As depicted in FIG. 17, in one embodiment, the pairwise candidate is based only on the spatial candidates. The spatial candidates at the beginning of this list are the most probable candidates, so this have sense that the pairwise should be a combination of this most probable candidates instead of the candidate which create more diversity when needed. In one alternative additional embodiment the pairwise candidate is set systematically at the second position. As the pairwise candidate uses information mainly from the first candidate by keeping its reference frame indexes (when they exist) and the first Merge candidate in the list is the most selected candidate. In this sense, a pairwise candidate offers a compromise to the second candidate in the list closer to the first candidate and is thus more likely to be selected than the other candidate(s) used to generate the pairwise candidate.

Building (Generating) the Pairwise Candidate

Figure 19:
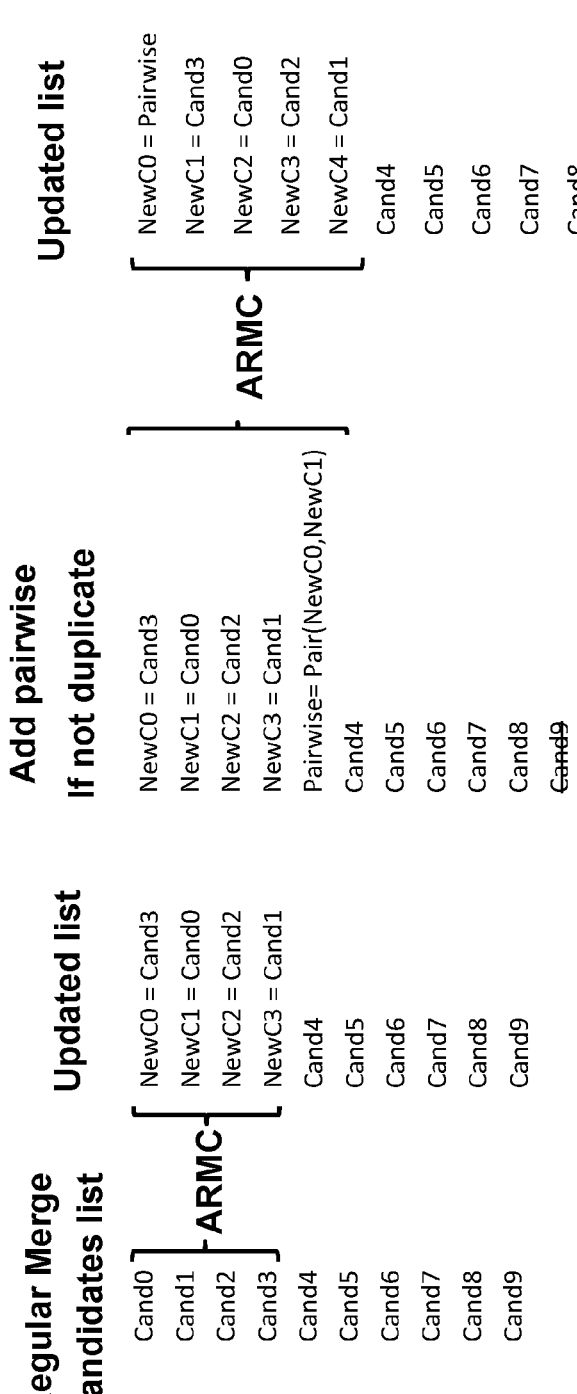
FIG. 19 illustrates the pairwise candidate derivation during the reordering process of the list of merge mode candidates.

The reordering process applied on the Merge list provides an opportunity to improve the process of generating the pairwise candidate. The pairwise candidate is built using the first candidates applied during a reordering process. This increases the likelihood that the pairwise candidate represents a compromise between the two best candidates as discussed above. This reordering process may be the Adaptive Reordering of Merge Candidates with Template Matching (AMRC) of the ECM. FIG. 19 illustrates this embodiment. In this figure, the building of the pairwise candidate between 2 candidates C0, C1, is represented by the function pair (C0, C1).

This embodiment can be more efficient than adding the pairwise as an early stage because in that case the pairwise candidate is built based on the most probable candidates of the list, as the aim of the reordering is to gives a better ordering of the most probable candidates. However, this embodiment is more complex as the pairwise can be built only once the reordering process of some candidates have been completed.

In one additional embodiment, when N is the number of candidates reordered, the pairwise candidate is built once N−1 candidates have been reordered in the list. This ensures that the maximum number of candidates have been reordered before producing the pairwise candidate.

In one additional embodiment, the pairwise candidate it is inserted at the position N and it is reordered using the reordering process. So the candidate number N is not removed from the list but set at the position N+1. In the same way all other candidates after position N increment their positions except the last candidate of the list which is removed.

Indeed it is preferable to not remove the candidate at the position N instead of the last candidate of the list because it could be a more interesting candidate compared to the candidate at the bottom of the list.

A validity check may be performed on the pairwise candidate prior to adding it to the list. In one additional embodiment, the validity check of the pairwise candidate includes a duplicate check. Yet, this duplicate check is a full duplicate check compared to the previous candidate 0 to N−1 as in the ECM but also compared to all candidate N+1 to maximum number of candidates.

Another way of building the pairwise candidate is to use the first candidate and the candidate at the $i^{th}$ position in the list of candidates (with i>1). The first candidate is the most probable candidate so is likely to be closer to the ideal motion vector predictor than any other candidate.

In one embodiment this pairwise candidate replaces the candidate at the $i^{th}$ position in the list of candidates.

This embodiment is efficient because, most of the time the first candidate is the most probable candidate, so the first candidate in the list should be close to the ideal candidate, so a pairwise between the first candidate and the candidate at the $i^{th}$ position in the list of candidates should be closer to the ideal candidate than the candidate at the $i^{th}$ position.

In one alternative, the pairwise built can be added without removing the candidate at the $i^{th}$ position but each candidate below the $i^{th}$ position is incremented and the last candidate in the list is removed.

In a similar manner to the above, a validity check may be performed prior to adding the pairwise candidate. The validity check of the pairwise candidate includes a duplicate check. Yet, this duplicate check is a full duplicate check compared to the previous candidate 0 to N−1as in the ECM but also compared to all candidate N+1 to maximum number of candidates.

Figure 20A:
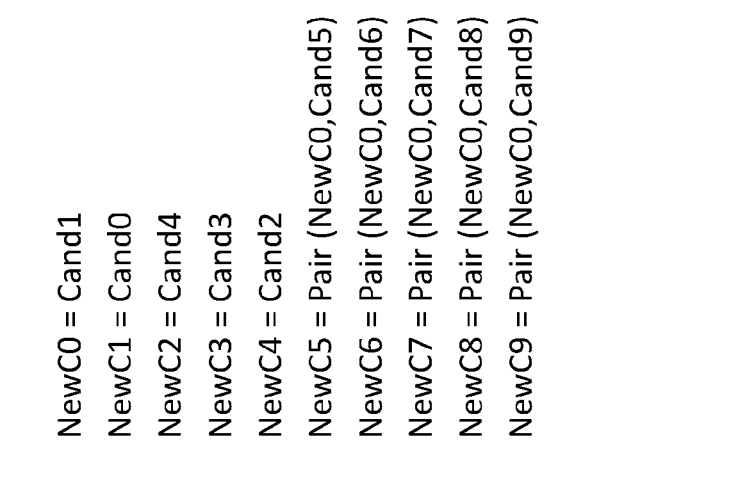

A particularly advantageous combination is to combine the method of generating the pairwise with the first and the candidate at the $i^{th}$ position and the reordering process. In that case the first candidate is closer to the ideal predictor. FIGS. 20a and 20b illustrate this embodiment and the following one.

In one additional embodiment, this process is applied on the candidates which have not been reordered by the reordering process. This essentially means the candidates which were not reordered are replaced by a pairwise candidate generated from the first candidate and the candidate which is to be replaced. The candidates lower down the list are less likely to be a good predictor, so replacing these with a candidate which is closer to the first candidate might improve the prediction.

FIG. 20b shows a similar reordering process to FIG. 20a. In this embodiment, the pairwise candidate is removed from the list of regular merge candidate derivation. It is added (if it is not a duplicate, described in more detail below) during the adaptive reordering of merge candidates with template matching ARMC. The pairwise candidate is built with the two first reordered candidates. The number of reordered candidates is kept constant, so the bottom candidate is removed. The number of the template matching costs computed (i.e. the number of candidates reordered) in this example is 5 (4 at the beginning followed by the pairwise), but as discussed above may be more or less than 5.

The pairwise candidate is also restricted to use only the average for one list when the reference frames of the first and second reordered candidate are the same. Moreover, the inheritance of the BCW index, the LIC flag and the multiple hypothesis parameters have been adapted.

In addition, each merge candidate, in the non-reordered subgroup, is replaced by a pairwise candidate between the first reordered candidate and this candidate if the created pairwise is not a duplicate.

When the reordering (e.g. ARMC) is applied to all candidates in the list, including an additional pairwise candidates may also be advantageous. These candidates can be built using combinations of the candidates from the candidate number 1 to the candidate number "maximum minus 1". But as the pairwise candidate between the first and the second candidate will have been already considered it is preferable to start from candidate number 2 (after the candidate number 0 and candidate number 1).

Accordingly, in one embodiment the additional pairwise candidates are added to the list even if all candidates are reordered e.g. by an ARMC process.

But sometimes, as these candidates produces motion information closest to the most probable motion information, it will be advantageous to not position the pairwise candidate (or candidates) at the top of the list of candidates. Otherwise the list of candidates used may not be diverse enough to provide effective competition and therefore coding efficiency In one embodiment, the additional pairwise candidates start at a predetermined position in the candidate list. This position may be a predetermined value. In a preferred embodiment this value is 5, that is to say the additional pairwise candidates are added at the $5^{th}$ position in the candidate list. In an alternative embodiment this value (position) is equal to the half of the maximum number of candidates in the Merge candidate list.

In one embodiment, the position (represented by a value) can be set equal to the position just after the first pairwise candidate (previously described) in the Merge candidate list, in the case where it has been added. This provides a good position to ensure diversity but this embodiment is more complex than the previous embodiments which use a predetermined position, because the position of the first pairwise candidate needs to be tracked.

ARMC Applied to a Secondary List of Candidates (e.g. a Subset of Candidates)

In our description of ARMC provided above, there are some implementations in which generation of a final Merge list has a step of including candidates from a second (or supplementary) list of candidates subjected to reordering (ARMC) with those of a first list of candidates to form a final list of candidates used to decode or encode an image portion. For example, in JVET-X0087 a first list could be considered the spatial and temporal candidates and a second (supplementary) list the non-adjacent candidates and History based candidates, in JVET-X0091 and JVET-X0133, the (ARMC) reordered and processed temporal candidates could be considered the second list and the other Merge candidates, to which the temporal candidate is added, the first list. The following embodiments are not limited, however, to these particular proposals and it will be appreciated that other possible permutations of first and second lists of candidates are possible. More generally, in the following embodiments, ARMC is applied to a second (supplementary) list of candidates. The reordering allows selection of one or more best candidates from the second list that are included in a final list of candidates. It is advantageous in terms of coding efficiency to consider how to include a pairwise candidate in the second list.

In one embodiment, the pairwise candidate is added to the second list in a same manner as when ARMC process is applied to the final Merge candidates list, by using the 2 first candidates of this reordered second list.

In one additional embodiment, the pairwise candidate is added to the second list and doesn't replace a candidate but it is added and the second list then reordered (e.g. AMRC process). This sometimes adds an additional candidate and consequently may increase the coding efficiency.

In one embodiment, several additional pairwise candidates are created and added in the second list of candidates. These candidates can be a pairwise candidate between the first candidate and an $i^{th}$ candidate number, where i is between 2 and the maximum number of candidates in this subset. The number of pairwise candidates can be determined as already described above in respect of the earlier embodiments describing how to generate the additional pairwise candidates.

These additional pairwise candidates can be also considered in the reordering (e.g. AMRC process). Additionally, the number of additional pairwise candidates is limited to 4.

In one embodiment, when the second list includes an original pairwise (before reordering), it is not removed from the second list even if additional pairwise candidates are added later. This creates diversity as the original pairwise takes into account the first candidates before the reordering and the pairwise during the ARMC process takes 2 candidates which should be different (and when they are the same the last one is not added).

In one embodiment, when a cost is computed for candidates, evaluated during one or more first ARMC process, and is used in a final ARMC process to avoid additional computation cost, the Pairwise candidate is not added in the second list if the candidate which it could replace has been evaluated in a first reordering process. This reduces the complexity of adding a new comparison.

In one additional embodiment, the pairwise candidate is added in the final list at the position of the last candidate which has not been evaluated in a first ARMC process of the second list. This provides the best opportunity to add a pairwise candidate.

In one embodiment, during a reordering (ARMC) process of the final list, the candidates which have a cost obtained during a first reordering process of a second list are taken into account in the final reordering process even if their positions in the list is not in a group (or portion of the candidates in the final list) which should be reordered using the ARMC process.

Motion Vector Threshold of the Duplicate Check

A further improvement is to the duplicate checking process, specifically the threshold within which two candidates are considered to be duplicates. In one embodiment, the motion vector threshold of the duplicate check is adapted for a pairwise candidate.

In one embodiment, the motion vector threshold of the duplicate check depends on the value of the search range of a decoder side motion vector method or based on the template matching search range. These search ranges essentially define the possible positions of the motion vector predictor around an initial position which could be obtain by the template matching. So, two motion vector predictors within search range are not necessarily different predictors and should be considered duplicates.

The decoder-side motion vector method may be:
a decoder side motion vector refinement depending on neighbouring samples of 2 blocks from 2 reference frames (different to the current one) (DMVR and BDOF of VVC)
a decoder side motion vector refinement based on the neighbouring samples of the current block and neighbouring samples from one or more reference frames (Template matching of ECM).
decoder side motion vector refinement based on the block predictor of the current block (PDOF of VVC).

In one embodiment, the motion vector threshold of the duplicate check depends on the enabling or the disabling of the decoder side motion vector method. In particular the decoder side motion vector refinement is enabled when the POC distance (or absolute POC value) between the current frame and the reference frame of each list is the same and the reference frames are into 2 different directions (one in forward and the other in the backward direction). In that case the motion vector threshold of the duplicate check depends on the value of search range and is set to a constant value otherwise.

In one other embodiment, the motion vector threshold of the duplicate check depends on the position in the list of the candidates used to build the pairwise. The earlier candidates are more likely to be selected, and as such a pairwise candidate representing a compromise position is likely to be useful. In contrast, a pairwise candidate which is similar to two candidates nearer the bottom of the list is less likely to be useful so should be considered a duplicate.

One implementation of this is when the pairwise candidate depends on the first and the second candidate in the list (before or after a reordering process) the motion vector threshold of the duplicate check is set to value (0 or greater). And when the pairwise candidate which depends on the first and the $i^{th}$ candidate, the motion vector threshold of the duplicate check is set to a value greater than or equal to the first threshold The motion vector threshold of the duplicate check may depend on whether the pairwise candidate was inserted into the list or added to replace a candidate in the list. For example, when the pairwise candidate is inserted in the list, the motion vector threshold of the duplicate check is lower or equal to the motion vector threshold of the duplicate check of a pairwise candidate which replaces a candidate.

The motion vector threshold of the duplicate check may depend on the reference frames of the pairwise candidate or on the current frame. In particular, if these reference frames have different directions, the value of the threshold is lower than if these reference frames have the same direction (or the value is based on a search range). This is because if two similar motion vector predictors originate from different reference frames it is likely that they are independent from one-another and that they are close to the ideal motion vector, as such, a pairwise candidate generated from these two candidates is likely to be useful.

Similarly, the motion vector threshold of the duplicate check may be based on whether the reference frames of the pairwise candidate or of the current frame have the same POC distance (or the same absolute value of the POC difference). For example, when the reference frames have the same POC distance between the current frame the MV threshold is lower or the threshold is based on a search range.

Derivation of Non-Motion Parameters for Pairwise Candidates

Non-motion parameters are parameters which do not relate to motion prediction, For example, they relate to tools which compensate illumination differences for the current image portion (e.g. block or coding unit). In one embodiment, all non-motion parameters for pairwise candidate are set equal to the non-motion parameters from one of the candidates used to build it. The non-motion parameters are hpelIfIdx, BCWidx, the multiple hypothesis parameters values 'addHypNeighbours' and LIC flag according the ECM implementation.

In a preferred embodiment, the candidate from which the non-motion parameters are inherited is the first candidate.

In one additional embodiment these non-motion parameters are set to those of the first candidate when the pairwise is built from the first and the second candidate.

Alternatively, when the pairwise candidate is built from the $i^{th}$ candidate (with i>1), non-motion parameters are set to the parameters of the $i^{th}$ candidate. In such an example, the $i^{th}$ candidate may be quite different to the $1^{st}$ candidate and the non-motion parameters of the first candidate would not be appropriate. Moreover, when several pairwise candidates are added, it is better to keep the diversity of the non-motion parameters of the different $i^{th}$ candidates. As opposite example, if all the $i^{th}$ are replaced by a pairwise candidates and the non-motion parameters are all inherited from the first candidate, they have all the same non-motion parameters as the first candidate, so the diversity is not enough for a better coding efficiency. This method is particularly relevant in combination with the earlier embodiment described with reference to FIG. 20 where the pairwise candidates are placed after the reordered candidates.

In one alternative embodiment, the parameters LICflag, hpelIfIdx, BCWidx are set equal to the values of the first candidate and the multiple hypothesis parameters values 'addHypNeighbours' is set equal to a default value representing that this method is not applied for the current candidate. An advantage of this alternative embodiment is a complexity reduction especially at decoder side, with a minor impact on the coding efficiency. Indeed, the multiple hypothesis has an impact of the encoding and decoding time.

In another embodiment the non-motion parameters depend on the first and the second candidates of the list. For example, the BowIdx is set equal to the value of the first and second candidates if they have the same value for both candidates and to a default value otherwise:

$$BcwIdx = (BcwIdx[0] == BcwIdx[1])? \; BcwIdx[0]: DEFAULT;$$

This can also be applied to the hpelIfIdx and LICflag. For the multiple hypothesis parameters, it is more complicated to compared all related parameters for 2 candidates so it is preferable to set it to the default value. In addition, it is preferable to set LICflag equal to a default value for the pairwise candidates.

An advantage of this embodiment is a coding efficiency improvement. As the first candidate and the second candidate of the list are likely the most promising candidates (especially when they have been reordered) consequently their parameters are likely to also be efficient and the comparison between these parameters increase the chance that they are useful for the current block.

In another embodiment, a non-motion parameter of a pairwise candidate depends on the characteristics of the candidates used to build it.

For example, a non-motion parameter for the pairwise candidate is set equal to the parameter of the first candidate, if the candidates considered for the pairwise have the same reference frames (and list) and to a default value otherwise (default or to a value which disables the method). This is because in such circumstances the pairwise candidate should have the same non-motion parameters. Indeed, for the parameters related to illumination compensation, motion information close to the motion information of first candidate is expected to have similar illumination compensation. For multiple hypothesis parameters, when they exist, it is preferable to inherit those of the most probable candidate instead of inheriting nothing. For the half-pel precision index, which is related to the motion vector precision of the motion information, if the reference frames are the same and the motion information close to the first candidate the motion information resolution is expected to be related.

For example for the BewIdx it is given by the following formula:

$$BcwIdx = (C0\_RefL0 = C1\_RefL0 \text{ and } C0\_RefL1 = C1\_RefL1)? \quad BcwIdx[0]: DEFAULT;$$

Where C0_RefL0 is the reference index of list L0 of the first candidate, C0_RefL1 the reference index of list L1 of the first candidate, and C1_RefL0 the reference index of list L0 of the second candidate, C1_RefL1 the reference index of list L1 of the second candidate. BcwIdx[0] is the BCWidx of the candidate 0. And (C?a:b) means if the condition C is true the value is set equal to a and to b otherwise.

In an alternative embodiment, a non-motion parameter for the pairwise candidate is set equal to the parameter of the first candidate, if this parameter is the same for both candidates used to build the pairwise and to a default value otherwise. If both candidates have the same parameters, the pairwise is expected to have the same parameters.

For example:

$$LICflag = LICflag [0] == LICflag [1]? LICflag [0] : default ;$$

In one embodiment, the parameters of the pairwise candidate related to tools, which compensate illumination difference between the current block and neighbouring samples (LIC) or illumination difference between block predictors (BCW), are set equal to the parameter of one of the candidates used to build the pairwise when the candidates have the same reference frames (and list).

In one embodiment, the parameters of the pairwise candidate related to tools, which compensate illumination difference between the current block and neighbouring samples (LIC) or illumination difference between block predictors (BCW), are set equal to the parameter of the candidates used to build the pairwise which have a parameters value different to the default value and when the candidates have the same reference frames (and list).

For example for the LIC flag of the pairwise candidate can be obtained according to the following formula:

$$LICflag = (C0\_RefL0 = C1\_RefL0 \text{ and } C0\_RefL1 = C1\_RefL1)? \quad (LICflag [0] \text{ OR } LICflag \quad [1])? : default ;$$

In this example LIC is set equal to the value 'true' if at least one of the 2 candidates' LIC flag is different to true. And if the pairwise is not a bidirectional candidate for the particular LIC implementation of the ECM.

In one additional embodiment, when one or more parameters related to tools, which compensate illumination (LIC-flag or BCWidx), are different to the default value, the parameter related to the multiple hypothesis parameters values 'addHypNeighbours' for the pairwise candidate is set equal to those of one candidate used to build the pairwise candidate.

In one alternative embodiment, the parameter related to the multiple hypothesis parameters values 'addHypNeighbours' for the pairwise candidate is set equal to those of one candidate used to build the pairwise candidate.

In one additional embodiment, the non-motion parameters of the one candidate listed above is the first candidate. In other words, for multiple hypothesis the candidate selected to obtain the non-motion parameters is the first candidate in the list.

All these embodiments improve the current coding efficiency of the pairwise candidate.

Conditional Building (Generating) of the Pairwise Candidate

In one embodiment, the pairwise candidate building is restricted to some conditions. Surprisingly, it has been found that while the pairwise predictor is frequently selected, there are instances where certain types of pairwise candidates are not appropriate. The following embodiments set out conditions for building a pairwise candidate which is more likely to be a useful candidate.

In one embodiment, the average between the motion vectors for one list (L0, L1), of the first and the second candidate used to build the pairwise candidate is computed only when the reference frames of the candidates are the same. Otherwise the motion vector of the first candidate is set when available and to the second candidate if available otherwise. This embodiment consists in changing the condition 1608 of FIG. 16 by the following:

$$If (refLx[0] != -1 \&\& refLx[1] != -1) \text{ and } (refLx[0] == refLx[1])$$

In one embodiment, when the current frame has all these reference frames, or the 2 first of each list pointing to only one direction (backward/forward), or the reference frame of the pairwise candidate, the average between candidates is not enabled for the pairwise candidate. In that case only the pairwise is a combined candidate for low delay configuration. The direction of the reference frame can be obtained by checking the POC distance value of reference frame and the current frame.

These conditions can adaptively enable or disable depending on the position of the candidates used to build the pairwise. For example, the condition on the reference frames having the same direction can be used only when the pairwise candidates build from the first candidate position and the $i^{th}$ candidate position in the list of Merge candidate.

All these embodiments can be combined unless explicitly stated otherwise. Indeed, many combinations are synergetic and may produce efficiency gains greater than a sum of their parts.

Implementation of the Invention

Figure 21:
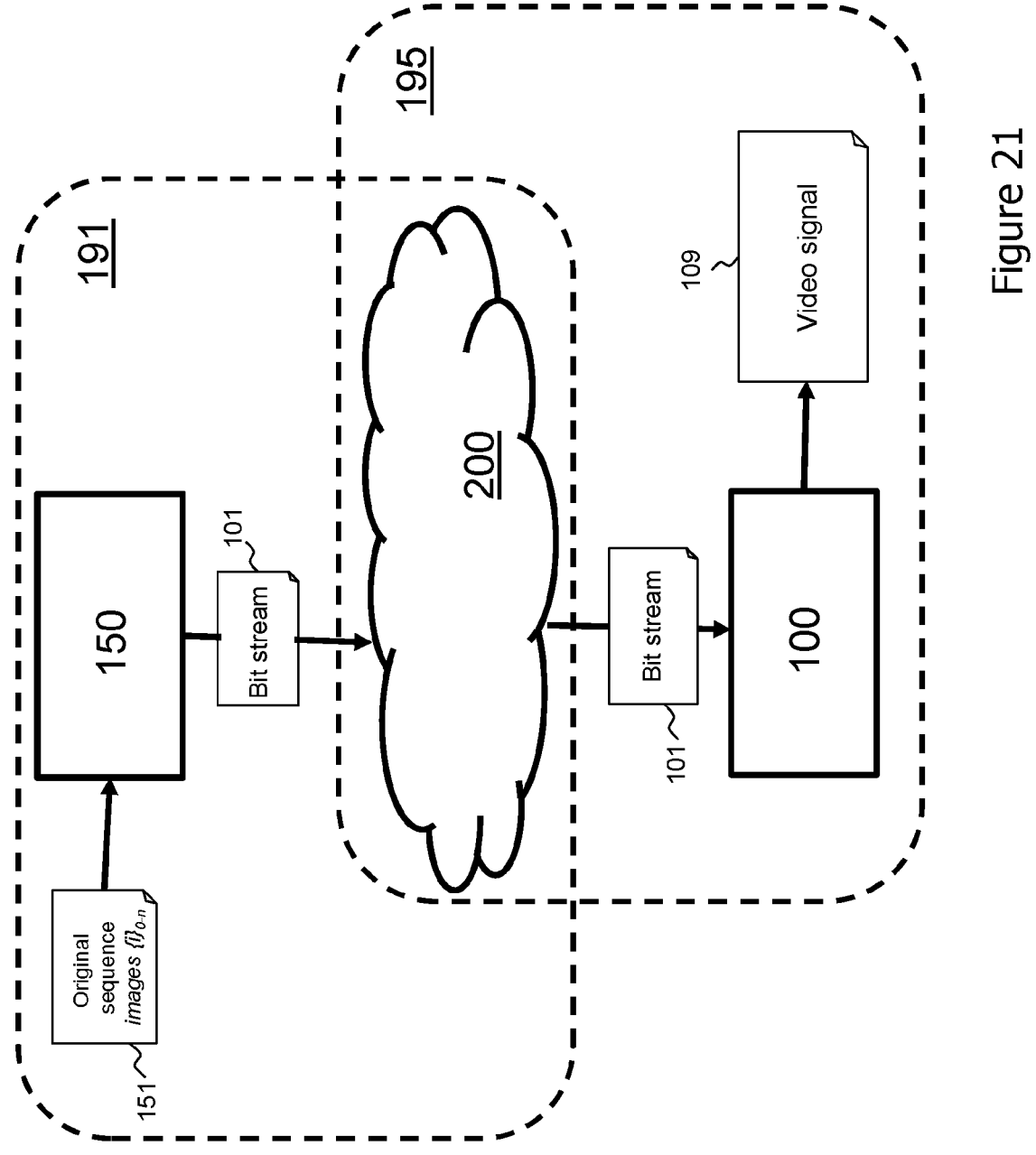
FIG. 21 is a diagram showing a system comprising an encoder or a decoder and a communication network according to embodiments of the present invention.

FIG. 21 shows a system 191 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (pro-vided/streamed) content to the user. The system 195 obtains/ receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 22:
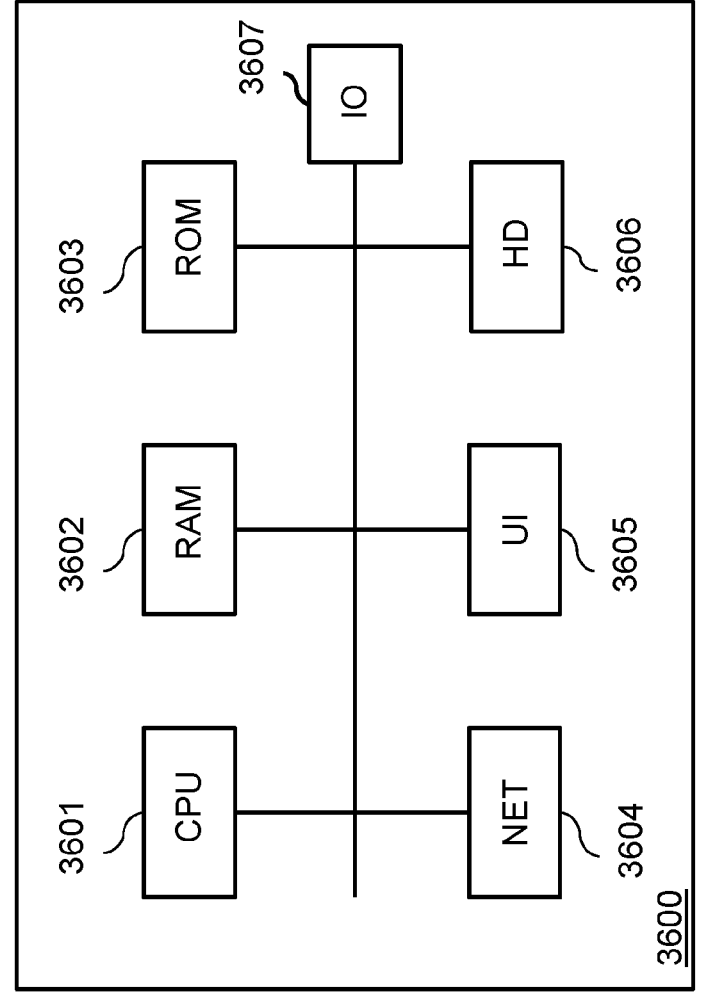
FIG. 22 is a schematic block diagram of a computing device for implementation of one or more embodiments of the invention.

FIG. 22 is a schematic block diagram of a computing device 3600 for implementation of one or more embodiments of the invention. The computing device 3600 may be a device such as a micro-computer, a workstation or a light portable device. The computing device 3600 comprises a communication bus connected to:—a central processing unit (CPU) 3601, such as a microprocessor;—a random access memory (RAM) 3602 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;—a read only memory (ROM) 3603 for storing computer programs for implementing embodiments of the invention;—a network interface (NET) 3604 is typically connected to a communication network over which digital data to be processed are transmitted or received. The network interface (NET) 3604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 3601;—a user interface (UI) 3605 may be used for receiving inputs from a user or to display information to a user;—a hard disk (HD) 3606 may be provided as a mass storage device,—an Input/Output module (IO) 3607 may be used for receiving/sending data from/to external devices such as a video source or display. The executable code may be stored either in the ROM 3603, on the HD 3606 or on a removable digital medium such as, for example a disk. According to a variant, the executable code of the programs can be received by means of a communication network, via the NET 3604, in order to be stored in one of the storage means of the communication device 3600, such as the HD 3606, before being executed. The CPU 3601 is adapted to control and direct the execution of the instructions or portions of software code of the program or programs according to embodiments of the invention, which instructions are stored in one of the aforementioned storage means. After powering on, the CPU 3601 is capable of executing instructions from main RAM memory 3602 relating to a software application after those instructions have been loaded from the program ROM 3603 or the HD 3606, for example. Such a software application, when executed by the CPU 3601, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 37 and 38.

Figure 23:
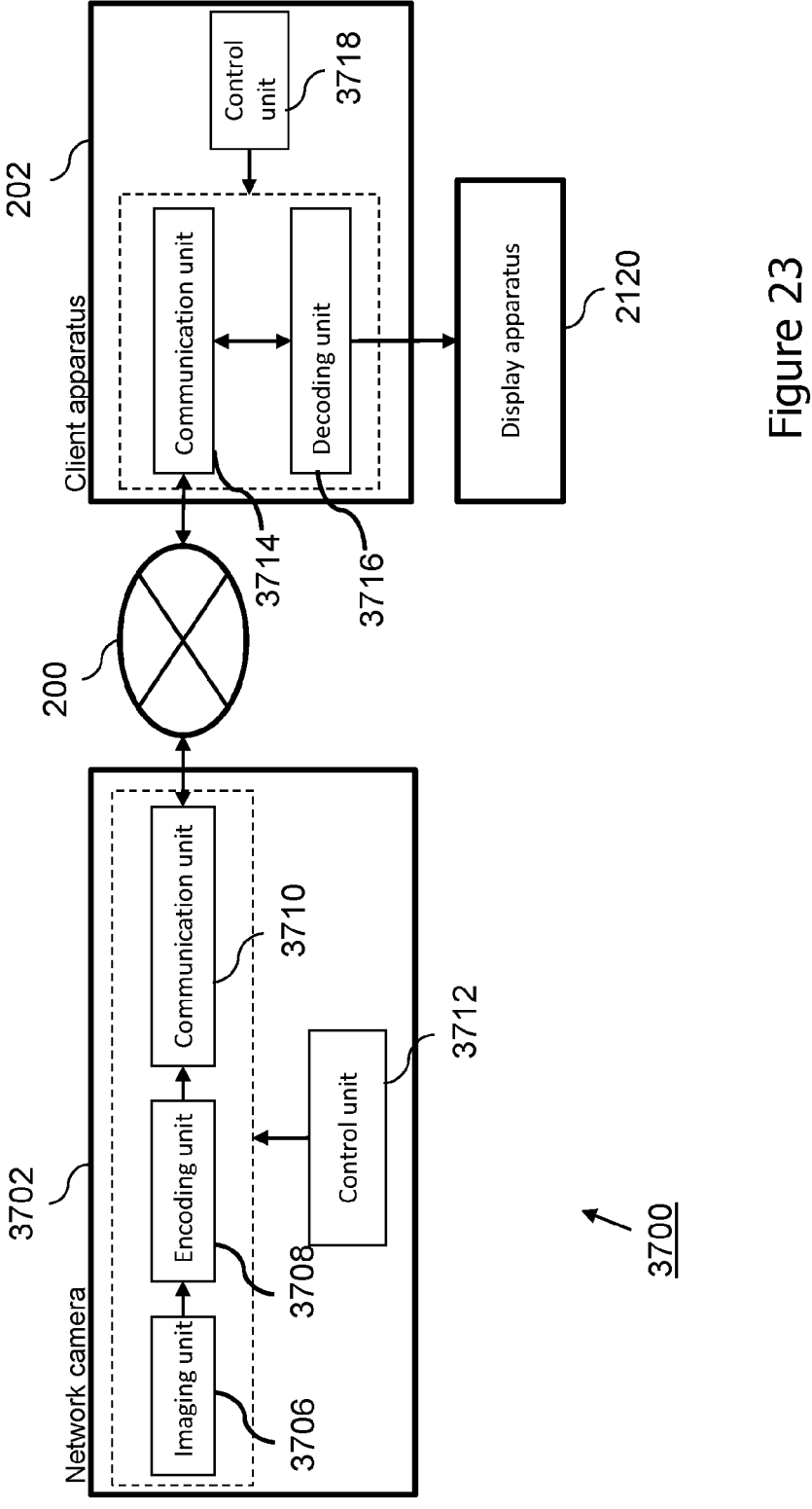
FIG. 23 is a diagram illustrating a network camera system.

FIG. 23 is a diagram illustrating a network camera system 3700 including a network camera 3702 and a client apparatus 202. The network camera 3702 includes an imaging unit 3706, an encoding unit 3708, a communication unit 3710, and a control unit 3712.

The network camera 3702 and the client apparatus 202 are mutually connected to be able to communicate with each other via the network 200.

The imaging unit 3706 includes a lens and an image sensor (e.g., a charge coupled device (CCD) or a complementary metal oxide semiconductor (CMOS)), and captures an image of an object and generates image data based on the image. This image can be a still image or a video image.

The encoding unit 3708 encodes the image data by using said encoding methods explained above, or a combination of encoding methods described above.

The communication unit 3710 of the network camera 3702 transmits the encoded image data encoded by the encoding unit 3708 to the client apparatus 202.

Further, the communication unit 3710 receives commands from client apparatus 202. The commands include commands to set parameters for the encoding of the encoding unit 3708.

The control unit 3712 controls other units in the network camera 3702 in accordance with the commands received by the communication unit 3712.

The client apparatus 202 includes a communication unit 3714, a decoding unit 3716, and a control unit 3718.

The communication unit 3714 of the client apparatus 202 transmits the commands to the network camera 3702.

Further, the communication unit 3714 of the client apparatus 202 receives the encoded image data from the network camera 3712.

The decoding unit 3716 decodes the encoded image data by using said decoding methods explained above, or a combination of the decoding methods explained above.

The control unit 3718 of the client apparatus 202 controls other units in the client apparatus 202 in accordance with the user operation or commands received by the communication unit 3714.

The control unit 3718 of the client apparatus 202 controls a display apparatus 2120 so as to display an image decoded by the decoding unit 3716.

The control unit 3718 of the client apparatus 202 also controls a display apparatus 2120 so as to display GUI (Graphical User Interface) to designate values of the parameters for the network camera 3702 includes the parameters for the encoding of the encoding unit 3708. The control unit 3718 of the client apparatus 202 also controls other units in the client apparatus 202 in accordance with user operation input to the GUI displayed by the display apparatus 2120.

The control unit 3718 of the client apparatus 202 controls the communication unit 3714 of the client apparatus 202 so as to transmit the commands to the network camera 3702 which designate values of the parameters for the network camera 3702, in accordance with the user operation input to the GUI displayed by the display apparatus 2120.

Figure 24:
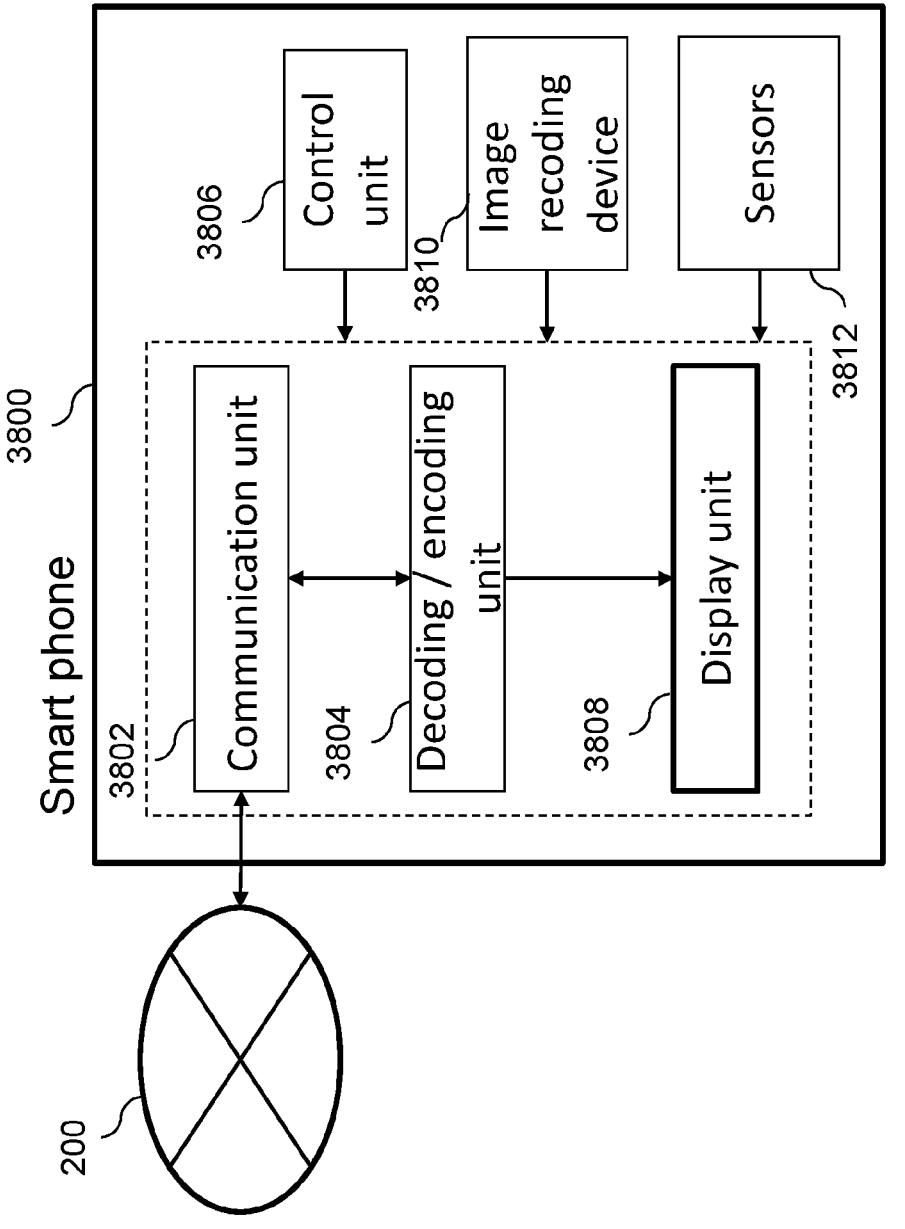
FIG. 24 is a diagram illustrating a smart phone.

FIG. 24 is a diagram illustrating a smart phone 3800.

The smart phone 3800 includes a communication unit 3802, a decoding unit 3804, a control unit 3806 and a display unit 3808.

the communication unit 3802 receives the encoded image data via network 200.

The decoding unit 3804 decodes the encoded image data received by the communication unit 3802.

The decoding/encoding unit 3804 decodes/encodes the encoded image data by using said decoding methods explained above.

The control unit 3806 controls other units in the smart phone 3800 in accordance with a user operation or commands received by the communication unit 3806.

For example, the control unit 3806 controls a display unit 3808 so as to display an image decoded by the decoding unit 3804. The smart phone 3800 may also comprise sensors 3812 and an image recording device 3810. In such a way, the smart phone 3800 may record images, encode the images (using a method described above).

The smart phone 3800 may subsequently decode the encoded images (using a method described above) and display them via the display unit 3808—or transmit the encoded images to another device via the communication unit 3802 and network 200.

Alternatives and Modifications

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bit-stream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of generating a list of motion vector predictor candidates for decoding a portion of an image, the method comprising:

generating an initial list of motion vector predictor candidates;

reordering at least a part of said initial list to generate a reordered list;

adding a pairwise motion vector predictor candidate into said reordered list, wherein the pairwise motion vector predictor candidate is generated from two or more candidates in said reordered list; and reordering at least a part of said reordered list including said pairwise motion vector predictor candidate.

2. The method according to claim 1, comprising determining said pairwise motion vector predictor candidate from the two top candidates in the reordered list.

3. The method according to claim 2, comprising applying the reordering process on said determined pairwise candidate.

4. The method according to claim 1, wherein the portion of said initial list which is reordered is a maximum of the top N−1 candidates.

5. The method according to claim 4, wherein the pairwise motion vector predictor candidate is reordered as the Nth candidate.

6. The method according to claim 1, further comprising removing the lowest candidate from the reordered list after adding said pairwise motion vector predictor candidate.

7. The method according to claim 1, wherein all candidates in the initial list are reordered to generate the reordered motion vector predictor candidate list.

8. The method according to claim 6, wherein one or more additional pairwise motion vector predictor candidates are included in the reordered list at a predetermined position.

9. The method according to claim 8, wherein the predetermined position is the $5^{th}$ position in the reordered list.

10. The method according to claim 8, wherein the predetermined position is at the start of the second half of the reordered list.

11. The method according to claim 6, wherein the initial list includes a first pairwise motion vector candidate and the additional pairwise motion vector candidate is added at a position immediately following the first pairwise motion vector candidate in the reordered list.

12. A method of generating a list of motion vector predictor candidates for encoding a portion of an image, the method comprising:

generating an initial list of motion vector predictor candidates;

reordering at least a part of said initial list to generate a reordered list;

adding a pairwise motion vector predictor candidate into said reordered list, wherein the pairwise motion vector predictor candidate is generated from two or more candidates in said reordered list; and reordering at least a part of said reordered list including said pairwise motion vector predictor candidate.

13. A decoding device configured to generate a list of motion vector predictor candidates for decoding a portion of an image, the device comprising:

a generator which generates an initial list of motion vector predictor candidates and reorders at least a portion of said initial list to generate a reordered list;

an adder which adds a pairwise motion vector predictor candidate into said reordered list, wherein the pairwise motion vector predictor candidate is generated from two or more candidates in said reordered list; and the generator reorders at least a part of said reordered list including said pairwise motion vector predictor candidate.

14. An encoding device configured to generate a list of motion vector predictor candidates for encoding a portion of an image, the device comprising:

a generator which generates an initial list of motion vector predictor candidates reorders at least a portion of said initial list to generate a reordered list;

an adder which adds a pairwise motion vector predictor candidate into said reordered list, wherein the pairwise motion vector predictor candidate is generated from two or more candidates in said reordered list; and the generator reorders at least a part of said reordered list including said pairwise motion vector predictor candidate.

15. A non-transitory computer-readable recording medium carrying a computer program comprising program instructions adapted to perform, when executed by one or more processors a method of generating a list of motion vector predictor candidates for decoding a portion of an image, the method comprising:

generating an initial list of motion vector predictor candidates;

reordering at least a portion of said initial list to generate a reordered list;

adding a pairwise motion vector predictor candidate into said reordered list, wherein the pairwise motion vector predictor candidate is generated from two or more candidates in said reordered list; and reordering at least a part of said reordered list including said pairwise motion vector predictor candidate.

16. A non-transitory computer-readable medium carrying a computer program comprising program instructions adapted to perform, when executed by one or more processors, a method of generating a list of motion vector predictor candidates for encoding a portion of an image, the method comprising:

generating an initial list of motion vector predictor candidates;

reordering at least a portion of said initial list to generate a reordered list;

adding a pairwise motion vector predictor candidate into said reordered list, wherein the pairwise motion vector predictor candidate is generated from two or more candidates in said reordered list; and reordering at least a part of said reordered list including said pairwise motion vector predictor candidate.

* * * * *